US012551494B2

(12) United States Patent
Min et al.

(10) Patent No.: US 12,551,494 B2
(45) Date of Patent: Feb. 17, 2026

(54) PHARMACEUTICAL COMPOSITION FOR PREVENTING OR TREATING DENGUE FEVER

(71) Applicant: SEOUL NATIONAL UNIVERSITY R&DB FOUNDATION, Seoul (KR)

(72) Inventors: Dal Hee Min, Seoul (KR); Ho Jeong Shin, Seoul (KR)

(73) Assignee: SEOUL NATIONAL UNIVERSITY R&DB FOUNDATION, Seoul (KR)

(*) Notice: Subject to any disclaimer, the term of this patent is extended or adjusted under 35 U.S.C. 154(b) by 418 days.

(21) Appl. No.: 18/277,653

(22) PCT Filed: Feb. 17, 2022

(86) PCT No.: PCT/KR2022/002339
§ 371 (c)(1),
(2) Date: Aug. 17, 2023

(87) PCT Pub. No.: WO2022/177316
PCT Pub. Date: Aug. 25, 2022

(65) Prior Publication Data
US 2024/0139209 A1     May 2, 2024

Related U.S. Application Data

(60) Provisional application No. 63/150,117, filed on Feb. 17, 2021.

(51) Int. Cl.
*A61K 31/573* (2006.01)
*A61P 31/14* (2006.01)

(52) U.S. Cl.
CPC .......... *A61K 31/573* (2013.01); *A61P 31/14* (2018.01)

(58) Field of Classification Search
CPC ....... A61K 31/56; A61K 31/57; A61K 31/573
See application file for complete search history.

(56) References Cited

U.S. PATENT DOCUMENTS

| 12,295,967 B2* | 5/2025 | Won | A61K 31/5415 |
| 2017/0051007 A1 | 2/2017 | Altschul et al. | |
| 2021/0228607 A1* | 7/2021 | Won | A61K 31/685 |

FOREIGN PATENT DOCUMENTS

| CN | 108727453 A * | 11/2018 | C07J 71/0031 |
| WO | WO 2010/099166 A1 | 9/2010 | |
| WO | WO-2016063269 A1 * | 4/2016 | A61K 31/4422 |
| WO | WO-2019209035 A1 * | 10/2019 | A61K 31/47 |
| WO | WO 2020/069138 A1 | 4/2020 | |

OTHER PUBLICATIONS

De Alwis (J. Virology vol. 90 pp. 4771-4779 published 2016) (Year: 2016).*
International Search Report for PCT/KR2022/002339 mailed on May 31, 2022.
Murji Ally et al., "Role of ethnicity in treating uterine fibroids with ulipristal acetate", Fertility and Sterility, vol. 106 (5), pp. 1165-1169, 2016 (http://dx.doi.org/10.1016/j.fertnstert.2016.06.012).

* cited by examiner

*Primary Examiner* — George W Kosturko
(74) *Attorney, Agent, or Firm* — PLEECHAE IP, LLC

(57) ABSTRACT

A pharmaceutical composition including a compound of Formula 1 may be used for preventing or treating dengue fever. Specifically, the composition may include ulipristal, ulipristal acetate, or a pharmaceutically acceptable salt thereof, which may inhibit dengue virus infection. The dengue fever may be caused by infection with dengue virus DENV-1, DENV-2, DENV-3 or DENV-4.

3 Claims, 14 Drawing Sheets

Specification includes a Sequence Listing.

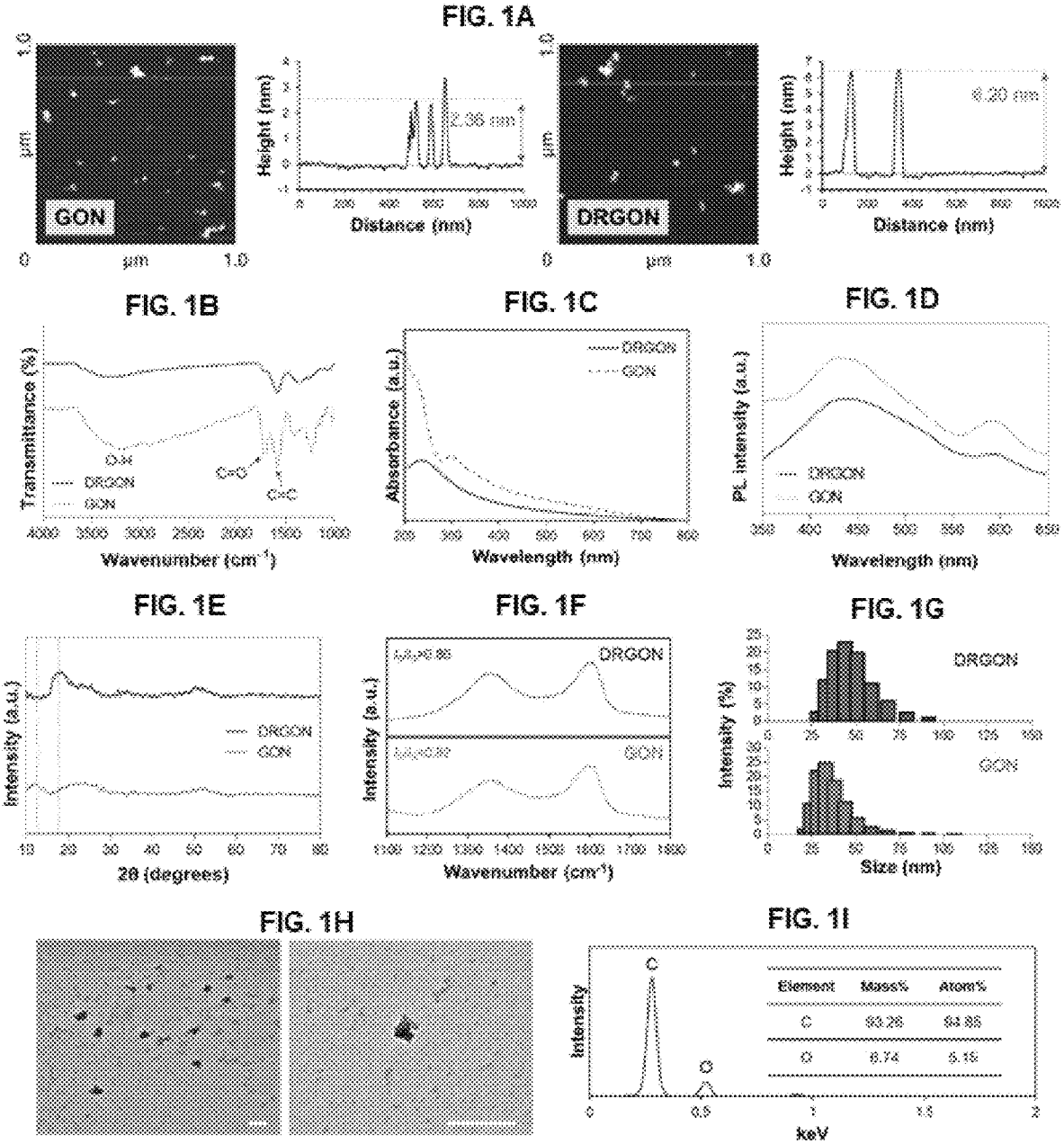

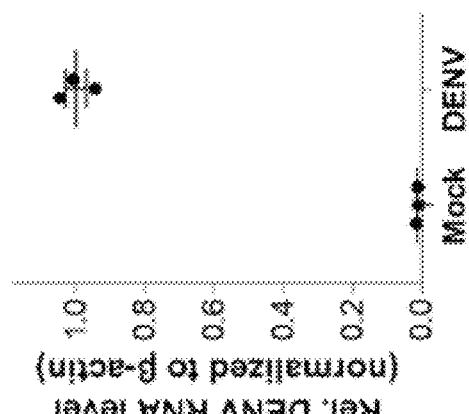
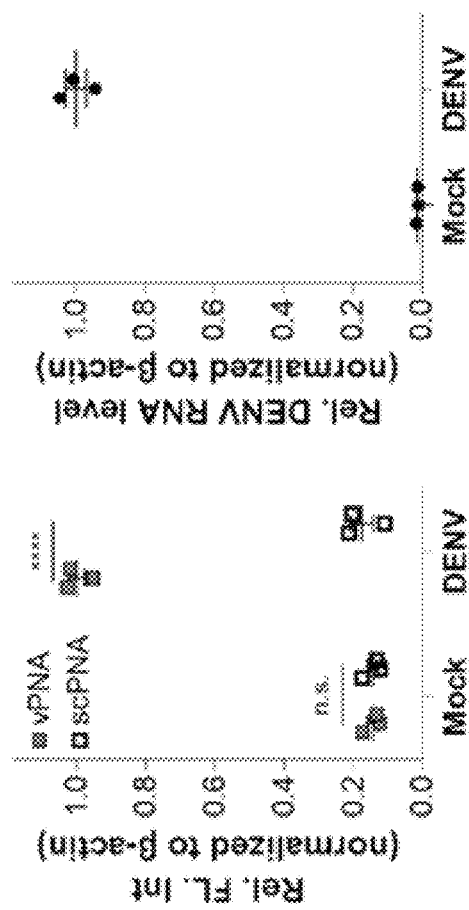
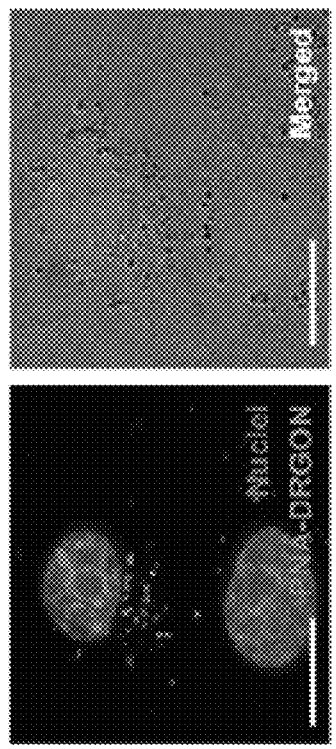
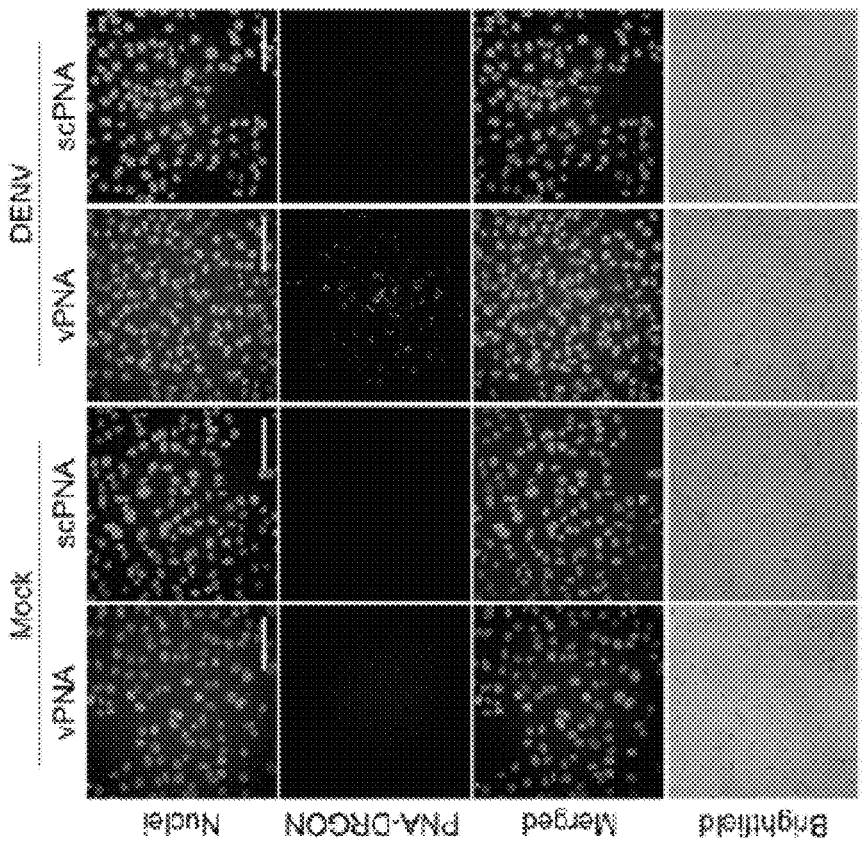

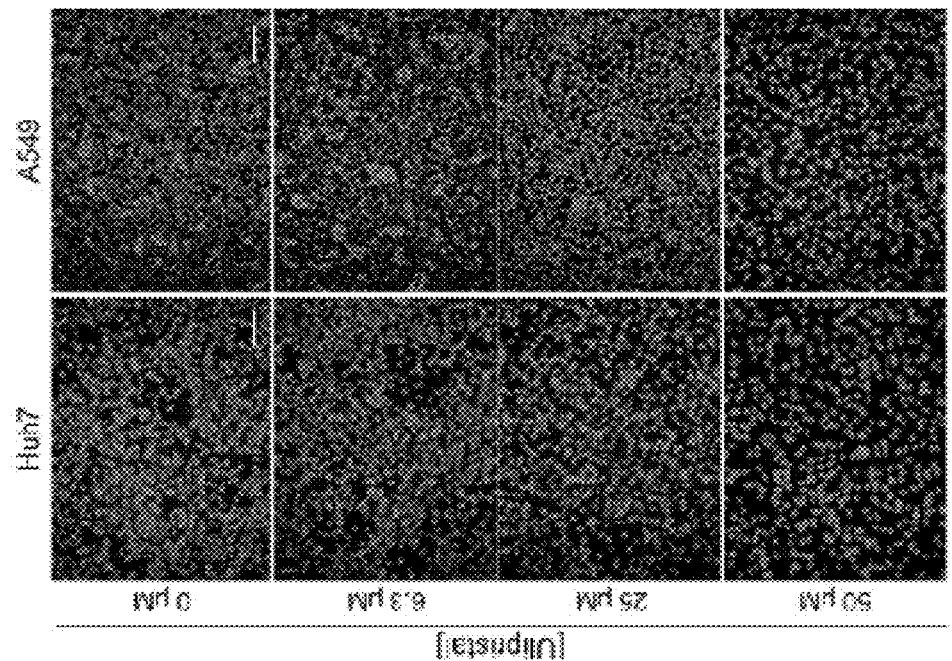
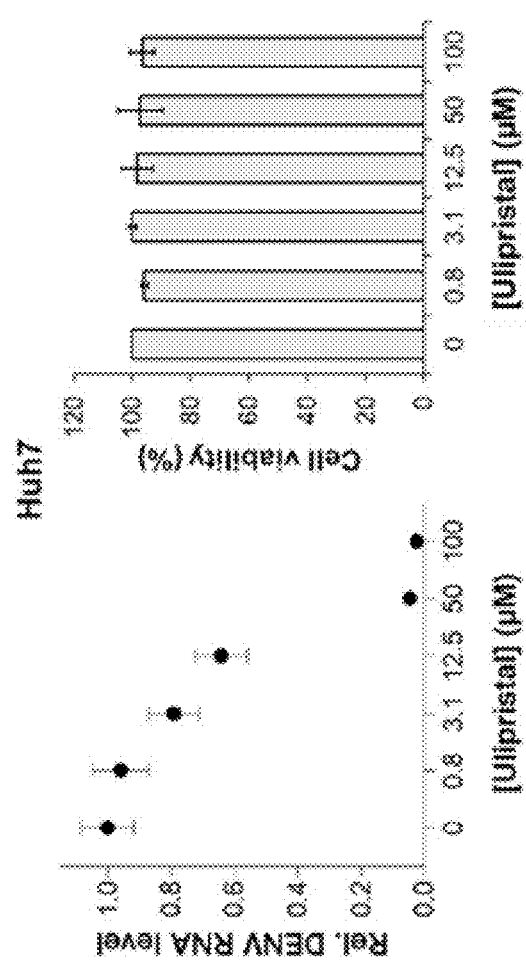
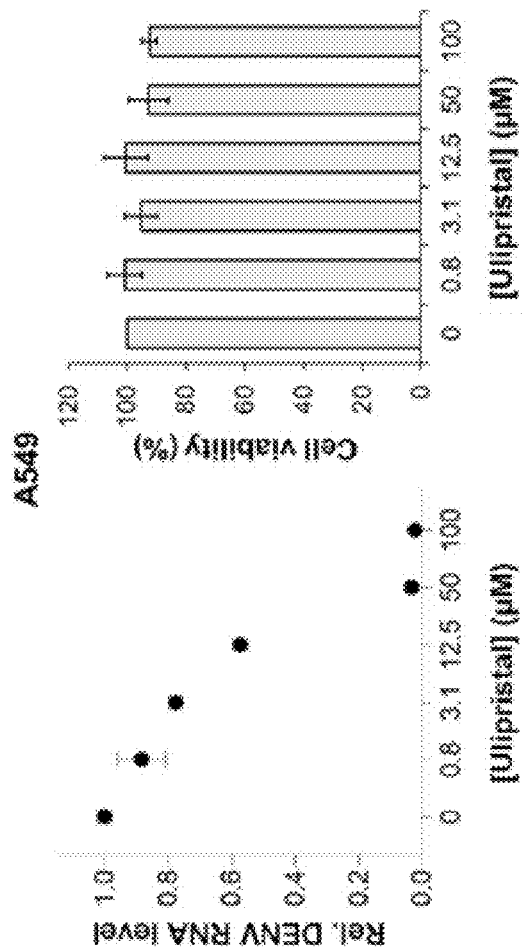
FIG. 11A
FIG. 11B
FIG. 11C

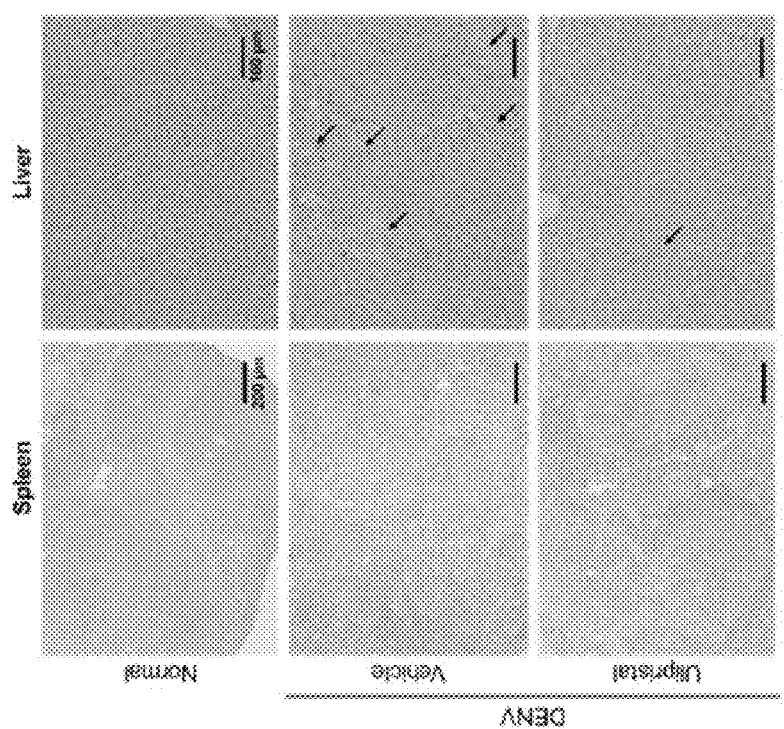
FIG. 12E
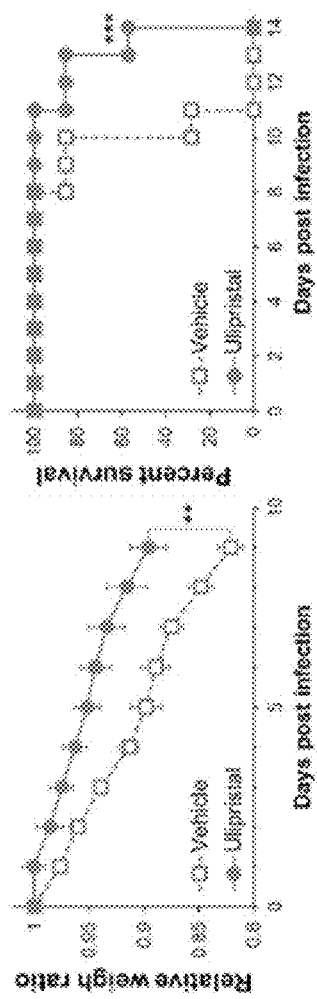
FIG. 12B
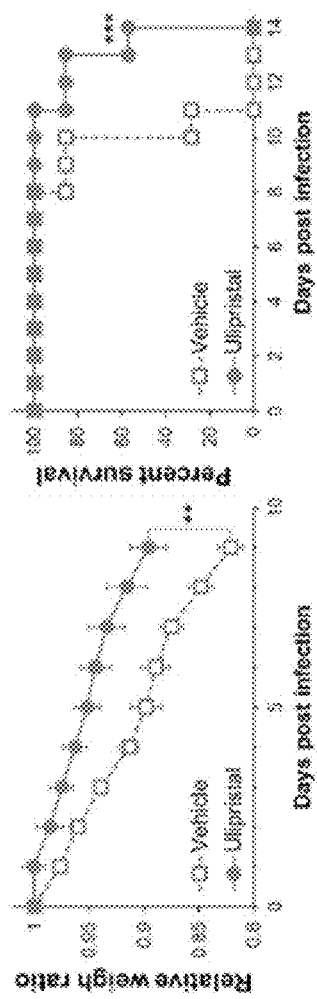
FIG. 12A
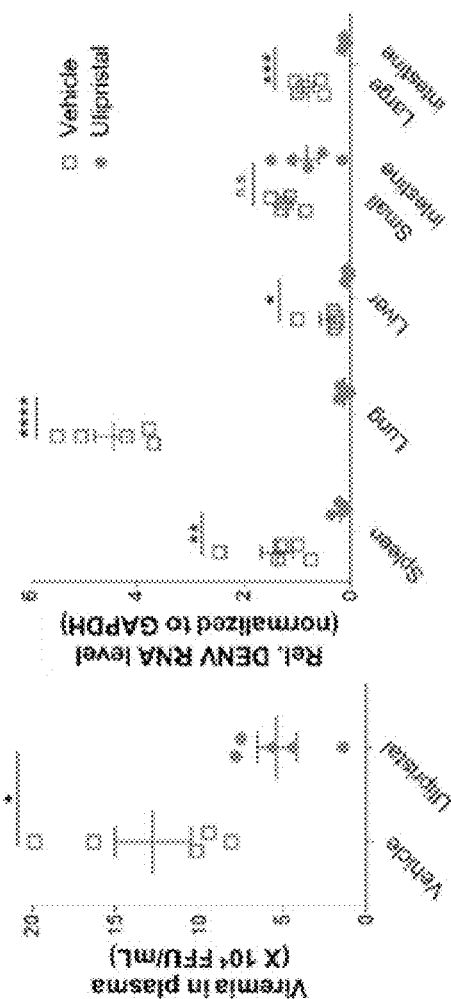
FIG. 12D
FIG. 12C

PHARMACEUTICAL COMPOSITION FOR PREVENTING OR TREATING DENGUE FEVER

CROSS REFERENCE TO RELATED APPLICATIONS AND CLAIM OF

This application claims benefit under 35 U.S.C. 119, 120, 121, or 365(c), and is a National Stage entry from International Application No. PCT/KR2022/002339 filed on Feb. 17, 2022, which claims the benefit of U.S. Patent Application No. 63/150,117 filed on Feb. 17, 2021, the disclosures of which are incorporated by reference herein in their entirety.

BACKGROUND

1. Technical Field

The present invention relates to a pharmaceutical composition for preventing or treating dengue fever, which may be used in the medical field.

2. Background Art

*Flaviviruses* are positive-stranded RNA viruses, including dengue virus, yellow fever virus, West Nile virus, and Japanese encephalitis virus. Among them, dengue virus is transferred to humans by mosquitoes and is considered a cause of serious public health problems worldwide, with about 50 out of 100 million people infected each year, and a high infection rate of nearly 6% in some regions. Dengue infections, particularly seriously fatal (dengue hemorrhagic fever, dengue shock syndrome), may be life-threatening and have resulted in large numbers of deaths. When looking at the trend of countries with dengue virus infection, it tends to appear mainly in tropical or subtropical regions. However, in recent years, this trend spreads up to Japan, a neighboring country of Korea. Since global warming is accelerated worldwide, and international population movement is also increased rapidly, the domestic situation is not safe.

In order to develop drugs for treatment of viruses, an analytical method for viral infection in host cells is required. A widely used dengue virus infection assay method includes a method for analysis of viral infectivity, a method for analysis of viral genomes and proteins, and use of genetically engineered viruses. However, these methods have disadvantages such as low reproducibility, labor intensive process, and use of expensive samples. Due to these reasons, development of new analytical strategy for mass-screening is now urgently required.

Dengue virus has a single-stranded RNA genome of about 11 kb in length, and the genome encodes an open reading frame (ORF), with a 5' untranslated region (UTR) and a 3' UTR on both sides of the ORF. ORFs encode three structural proteins (capsid, membrane, and envelope proteins) and seven nonstructural proteins (NS1, NS2A, NS2B, NS3, NS4A, NS4B, and NS5). When dengue virus infects a host cell, it generates its own helicase and nucleic acid polymerase (RdRp: RNA-dependent RNA Polymerase) using the proteins of the host cell, and uses them to replicate its own genome and propagate the virus. In this process, the dengue virus RNA genome is accumulated in the host cell. At this time, by measuring the amount of the RNA genome generated in the cell, the infection of the dengue virus can be analyzed.

Accordingly, the inventors of the present invention have screened an antiviral drug against dengue virus using GOViRA (Graphene Oxide-based Viral RNA Analysis system) and confirmed effects thereof, and therefore, the present invention has been completed on the basis of the results.

SUMMARY

An object of the present invention is to provide a pharmaceutical composition capable of preventing or treating dengue fever.

1. A pharmaceutical composition for preventing or treating dengue fever, including a compound represented by Formula 1 or a pharmaceutically acceptable salt thereof:

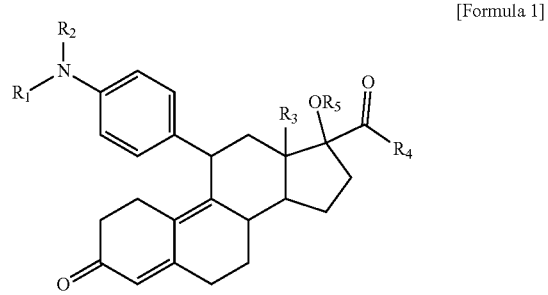

[Formula 1]

(wherein
$R_1$ to $R_4$ are each independently an alkyl group having 1 to 5 carbon atoms; and
$R_5$ is hydrogen or an acetyl group).

2. The pharmaceutical composition according to the above 1, wherein $R_1$ to $R_4$ are methyl.

3. The pharmaceutical composition according to the above 1, wherein the dengue fever is caused by infection with dengue virus DENY-1, DENV-2, DENV-3 or DENV-4.

BRIEF DESCRIPTION OF THE DRAWINGS

FIGS. 1A to 1I show characteristics of GON and DRGON, wherein FIG. 1A is AFM image with height profile; FIG. 1B is FT-IR spectrum; FIG. 1C is UV-Vis spectrum; FIG. 1D is PL spectrum; FIG. 1E is XRD pattern; FIG. 1F is Raman spectrum; FIG. 1G is DLS analysis; FIG. 1H is TEM image of DRGON, and Scale bar: 100 nm; and FIG. 1I is EDS analysis of DRGON.

FIGS. 4A to 4F show the selectivity of the GOViRA nanosensor, wherein FIG. 4A is a schematic image of PNA-DRGON complex formation; FIG. 4B is a relative fluorescence intensity of Cy5-labeled PNA probes with increasing amount of DRGON; FIG. 4C is a fluorescence emission spectrum of Cy5, and the fluorescence was quenched by the formation of the PNA-DRGON complex; FIG. 4D is fluorescence restored by addition of target RNA in a sequence-specific manner; FIG. 4E is the quenched fluorescence remained stable for 24 hours in the presence of serum; and FIG. 4F is fluorescence restored upon addition of target RNA in a sequence-specific manner in the presence of serum.

FIGS. 5A to 5D show the qualitative and quantitative detection of intracellular DENV genomes through the GOViRA system in uninfected and DENV-infected Vero E6 cells, wherein FIG. 5A is fluorescence images of uninfected and DENV-infected Vero E6 cells taken 5 hours after PNA-DRGON complex treatment, and the PNA-DRGON complex was introduced at 48 h p.i. Cy5 labeled vPNA or scPNA, Scale bar: 25 μm. (Red, Cy5 signal of PNA probe; blue, Hoechst signal of nucleus); FIG. 5B is quantitative analysis of Cy5 signal of treated PNA-DRGON complex in uninfected and DENV-infected Vero E6 cells, the relative intensity of each signal was normalized to the β-actin signal as an internal control, values represent mean±SEM (n=3); and statistical significance was determined by Student's t-test (n.s.: not significant, ****P≤0.0001); FIG. 5C is qRT-PCR analysis of expression of the DENV genome in Vero E6 cells, and values represent mean±SEM (n=3); and FIG. 5D is fluorescence images of DENV-infected Vero E6 cells taken 5 hours after vPNA-DRGON complex treatment under a DeltaVision microscope; Scale bar: 15 μm. (Red, Cy5 signal from the PNA probe, blue, Hoechst signal from the nucleus).

FIGS. 8A to 8C show an increase in the fluorescence signal over time in Vero E6 cells infected with DENV, wherein FIG. 8A is PNA-DRGON complexes treated at each indicated time point, and fluorescence images were taken 5 hours after PNA-DRGON complex treatment. Scale bar: 25 μm. (Red, Cy5 signal from the PNA probe, blue from the nucleus, Hoechst signal); FIG. 8B is relative quantification of the fluorescence signal corresponding to viral RNA; and FIG. 8C is a linear correlation between GOViRA and qRT-PCR analysis of viral RNA in Vero E6 cells at each time point. Values represent mean±SEM (n=3).

FIGS. 9A to 9E show the application of the GOViRA platform to high-throughput DENV inhibitor screening, wherein FIG. 9A is a schematic diagram of the GOViRA system-based high-throughput screening timeline; FIG. 9B is the relative quantification of fluorescence signal with increasing MOI, and values represent mean±SEM (n=3); FIG. 9C is Z'-factors calculated for high-throughput screening in 20 replicates of each control; and FIG. 9D is analysis of DENV infection for ribavirin using the GOViRA system. DENV-infected Vero E6 cells, which were treated with ribavirin concentrations ranging from 6.25 μM to 400 μM. After 48 hours, the PNA-DRGON complex was treated and DENV activity was measured. The expected EC50 value for DENV serotype 2 for ribavirin was 49.2±0.2 μM. Values represent mean±SEM (n=3); and FIG. 9E is the performance of selection for anti-DENV agents. Cell viability and corresponding fluorescence intensity values for each drug are plotted.

FIGS. 10A to 10D are verification of ulipristal in Vero E6 cells, wherein FIG. 10A is the chemical structure of ulipristal; FIG. 10B is the anti-DENV activity of ulipristal investigated using FFA. The estimated EC50 for DENV serotype 2 for ulipristal was 8.28 μM; FIG. 10C is the corresponding images of viral lesions treated with representative concentrations of ulipristal; and FIG. 10D is qRT-PCR analysis of viral RNA in Vero E6 cells with dose-dependently treated ulipristal and corresponding cell viability. Values represent mean±SEM (n=3).

FIGS. 11A to 11C show the validation of ulipristal in Huh7 and A549 cells, and qRT-PCR analysis of viral RNA using dose-dependently treated ulipristal in DENV-infected Huh7 cells FIG. 11A and A549 cells FIG. 11B. Values represent mean±SEM (n=3). FIG. 11C is Immunofluorescence images showing the DENV E antigen (green) and nucleus (blue) on the dose-dependent antiviral effect of ulipristal in Huh7 and A549 cells.

FIGS. 12A to 12E show in vivo antiviral treatment investigation results for a DENV-infected mouse model, wherein AG129 mice infected with DENV were treated with 15 mg/kg of ulipristal once a day, and the infected mice were monitored for relative body weight changes FIG. 12A and survival plots FIG. 12B. Values represent mean±SEM (n=7). Statistical significance was determined by Student's t-test (**P≤0.01; FIG. 12A) and log-rank test (P=0.0007; FIG. 12B). Viremia in plasma FIG. 12C and viral RNA load in organs FIG. 12D of DENV-infected AG129 mice p.i. Values represent mean±SEM (n=5). Statistical significance was determined by Student's t-test (n.s.: not significant, *P≤0.05, P≤0.01, *P≤0.001 and ****P≤0.0001; FIGS. 12C and 12D). FIG. 12E is H&E cross-sectional microscopy images of the spleen and liver of AG129 mice.

FIGS. 14A and 14B show that ulipristal inhibits DENV infection in the entry phase, wherein FIG. 14A is timeline analysis of the addition time of ulipristal; and FIG. 14B is qRT-PCR analysis of intracellular viral RNA levels in A549 cells. Values represent mean±SEM (n=3). Statistical significance was determined by Student's t-test (*P≤0.001, **P≤0.0001, vs. DMSO).

DETAILED DESCRIPTION

Figure 2A:
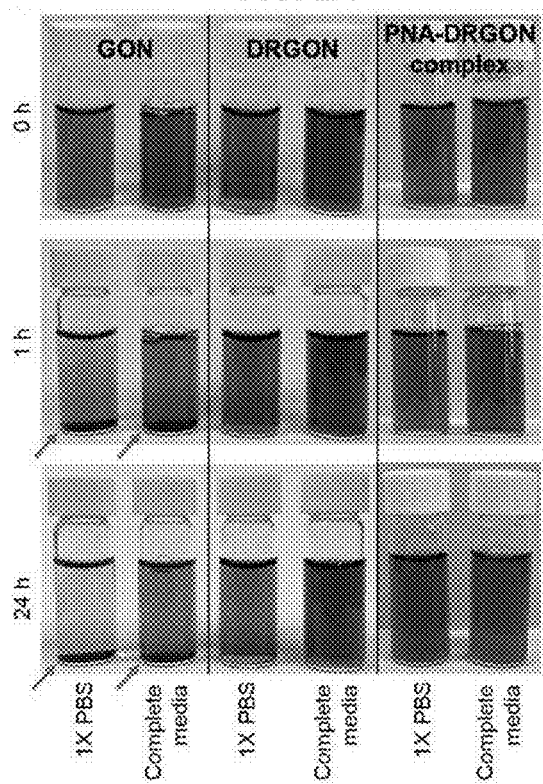
FIG. 2A shows, after storage of digital images of GON, DRGON and PNA-DRGON complexes in 1× PBS and total media for the indicated times, 100 μg/mL nanoparticles (GON and DRGON) and 1.67 μM vPNA dispersed in each solution.

Hereinafter, the present invention will be described in detail.

The present invention relates to a pharmaceutical composition for preventing or treating dengue fever, which includes a compound represented by Formula 1 below or a pharmaceutically acceptable salt thereof.

[Formula 1]

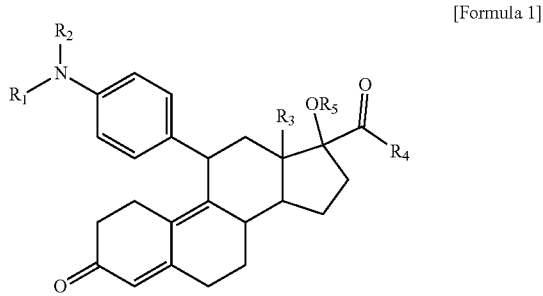

(wherein

R₁ to R₄ are each independently an alkyl group having 1 to 5 carbon atoms, and

R₅ is hydrogen or an acetyl group)

The alkyl group may be, for example, methyl, ethyl, n-propyl, isopropyl, n-butyl, isobutyl, sec-butyl, tert-butyl, n-pentyl and the like.

Specifically, R₁ to R₄ may be methyl, and in this case, the compound is ulipristal or ulipristal acetate.

Both ulipristal and ulipristal acetate are substances known as selective progesterone receptor modulators (SPRMs), and are widely used as drugs showing equivalent effects in vivo.

The expression "pharmaceutically acceptable salt" refers to a salt prepared using a specific compound according to the present invention, as well as acid or base relatively nontoxic thereto. The pharmaceutically acceptable salt may include, for example, acid addition salts or metal salts.

The acid addition salts may be formed from inorganic acids such as acetate, hydrochloric acid, nitric acid, phosphoric acid, sulfuric acid, hydrobromic acid, hydroiodic acid, nitrous or phosphorous acid, aliphatic mono and dicarboxylates, phenyl-substituted alkanoates, hydroxy alkanoates and alkane dioates, and non-toxic organic acids such as aromatic acids, aliphatic and aromatic sulfonic acids. These pharmaceutically non-toxic salts may include sulfate, pyrosulfate, bisulfate, sulfite, bisulfite, nitrate, phosphate, monohydrogen phosphate, dihydrogen phosphate, metaphosphate, pyrophosphate, chloride, bromide, iodide, fluoride, propionate, decanoate, caprylate, acrylate, formate, isobutyrate, caprate, heptanoate, propyolate, oxalate, malonate, succinate, suberate, sebacate, fumarate, maleate, butine-1,4-dioate, nucleic acid-1,6-dioate, benzoate, chlorobenzoate, methylbenzoate, dinitrobenzoate, hydroxybenzoate, methoxybenzoate, phthalate, terephthalate, benzene sulfonate, toluene sulfonate, chlorobenzene sulfonate, xylene sulfonate, phenylacetate, phenylpropionate, phenylbutyrate, citrate, lactate, β_hydroxybutyrate, glycolate, malate, tartrate, methane sulfonate, propane sulfonate, naphthalene-1-sulfonate, naphthalene-2-sulfonate or mandelate. For example, an acid addition salt of a compound represented by Formula 1 may be obtained by dissolving the compound in an excess aqueous acid solution, and precipitating the salt using a hydrating organic solvent such as methanol, ethanol, acetone or acetonitrile.

The metal salt may be a sodium, potassium or calcium salt. The metal salt may be prepared using a base, for example, alkali-metal or alkaline earth metal salts may be obtained by dissolving the compound in an excess amount of alkali-metal hydroxide or alkaline earth metal hydroxide solution, filtering the non-dissolved compound salt, and evaporating or drying the filtrate.

The pharmaceutical composition of the present invention may be provided by mixing the same with conventionally known substances for preventing or treating dengue fever. That is, the pharmaceutical composition of the present invention may be administered in combination with the known substances having effects of preventing or treating dengue fever.

The composition of the present invention may be formulated and used in the form of oral formulations such as powder, granules, tablets, capsules, suspension, emulsion, syrup, aerosol, etc., external applications, suppositories, and sterile injection, but it is not limited thereto.

Carriers, excipients and diluents able to be contained in the composition may include, for example, lactose, dextrose, sucrose, dextrin, maltodextrin, sorbitol, mannitol, xylitol, erythritol, maltitol, starch, acacia rubber, alginate, gelatin, calcium phosphate, calcium silicate, cellulose, methyl cellulose, microcrystalline cellulose, polyvinyl pyrrolidone, water, methylhydroxy benzoate, propylhydroxy benzoate, talc, magnesium stearate and mineral oil, but they are not limited thereto. Such formulations are produced using diluents or excipients such as fillers, extenders, binders, wetting agents, disintegrants, surfactants, etc., which are typically used in the art, but they are not limited thereto.

Solid formulations for oral administration may include tablets, pills, powder, granulates, capsules, etc., without limitation thereof, and such solid formulations may be prepared by admixing the compound as described above with at least one excipient, for example, starch, calcium carbonate, sucrose, lactose, gelatin and the like. Further, other than simple excipients, lubricants such as magnesium stearate, talc, etc. may also be used.

Formulations for parenteral administration may include sterile aqueous solution, non-aqueous solvent, suspending agents, emulsions, freeze-dried preparations, suppositories and the like. The non-aqueous solvents or suspending agents used herein may include propylene glycol, polyethylene glycol, vegetable oil such as olive oil, injectable ester such as ethyl oleate, etc. As a base of the suppository, witepsol, macrogol, tween 61, cacao butter, laurin, glycerogelatin, and the like may be used. Liquid preparations for oral administration may include suspending agents, liquid solutions, emulsions, syrups, etc. In addition to water and liquid paraffin, which are commonly used as simple diluents, a variety of excipients such as wetting agents, sweetening agents, fragrances, and preservatives may also be included.

The compound of the present invention may, for example, inhibit dengue virus infection by suppressing invasion of dengue virus into host cells, and may have prophylactic or therapeutic effects on dengue fever, but it is not limited thereto.

The dengue fever is a viral disease mediated by Aedes mosquitoes, and refers to a disease caused by mosquito bites and infection with dengue virus (DENV). A severe form of dengue fever is dengue hemorrhagic fever, which is accompanied by bleeding and presents with circulation disorders, and dengue shock syndrome, which is accompanied by increased vascular permeability and hypotensive shock.

Dengue virus belongs to the genus *Flavivirus*, and there are four types of DENV-1, DENV-2, DENV-3 or DENV-4 depending on the serotype. In the present invention, the dengue fever may be caused by infection with dengue virus DENV-1, DENV-2, DENV-3 or DENV-4.

The present invention includes a method for treatment of dengue fever using the above composition. Specifically, the method may include administering the composition to a subject in need of treatment, wherein the subject may have a dengue virus infection or may have a dengue virus. The dengue virus may be DENV-1, DENV-2, DENV-3 or DENV-4. The subject may be a mammal including a human.

The administration method is not limited, and may be conducted according to a method known in the art, and may be implemented orally or parenterally.

Further, the present invention relates to a screening method for a therapeutic drug for a viral infection.

The method may include treating a candidate substance of a therapeutic agent for virus infection with a mixture of a target viral genome, graphene oxide, and a fluorescent probe having a binding ability to the genome of the target virus, and then, comparing the fluorescence intensity with a control.

The viral genome may be an isolated genome or a genome contained in a virus.

The control may be a fluorescence intensity of the mixture before the treatment. For example, when the fluorescence intensity is decreased after the treatment, the candidate substance may be selected as the therapeutic agent for viral infection.

Further, the control may be a negative control having no effect on the treatment of viral infections, a positive control with known effects on treating viral infections, or a control with unknown effects on treating viral infections.

The mixture may be present in an environment capable of replication of the viral genome, for example, in a host cell of the virus. In this case, the viral genome accumulates in the host cell, and thus, may lead to an increase in the fluorescence intensity. Therefore, in order to compensate this possibility, the mixture may be compared with other controls.

When the fluorescence intensity was measured after treatment with the candidate substance of a therapeutic agent for virus infection, if the fluorescence intensity is reduced compared to a case of treating with the negative control, it may be selected as the virus therapeutic agent. Alternatively, when the fluorescence intensity is equal to or further reduced compared to a case of treating with the positive control after treatment with the candidate substance of a therapeutic agent for virus infection, the candidate substance may be selected as the therapeutic agent for the virus. Alternatively, a control having unknown effects on treatment of the virus infection, that is, a substance with a greater decrease in the fluorescence intensity compared to other candidate substances may be selected as a therapeutic agent.

The control may be one or more. The fluorescence intensity of the control may be each value obtained from one or a plurality of controls, or may be an average value, a median value, a mode, or the like, of the values obtained therefrom.

With regard to the decrease in the fluorescence intensity by the treatment of the candidate substance, since the genome of the virus in the mixture is reduced due to virus infection therapeutic effects of the candidate substance, probes adsorbed to graphene oxide without binding to the genome of the virus so as to quench the fluorescence is increased, and thereby the fluorescence intensity may be weakened.

Specifically, the graphene has a planar single-layer structure in which carbon atoms are filled into a two-dimensional lattice, and the graphene has a unique electron transport property, which causes graphene oxide to quench adjacent fluorescence signals of the fluorescence dye through a fluorescence resonance energy transfer (FRET) phenomenon.

The probe may be adsorbed to the graphene oxide, and at this time, the fluorescence signal of a fluorescent label bound to the probe is quenched. The adsorption may be performed, for example, by interaction between graphene oxide and π electrons of the probe, complexation, ion exchange, electrostatic interaction, surface adsorption by van-der-Waals attraction, hydrogen bond, etc. For example, a single-stranded peptide nucleic acid (PNA) probe may be adsorbed to the graphene oxide by pi-pi bond between the exposed base and a hydrophobic surface of the graphene oxide.

In the presence of the target viral genome, to which the probe is specifically bound, the probe is not adsorbed to graphene oxide and is released, whereby the fluorescence of a fluorescent material contained in the probe is emitted out of the fluorescence resonance energy transfer phenomenon.

Figure 3:
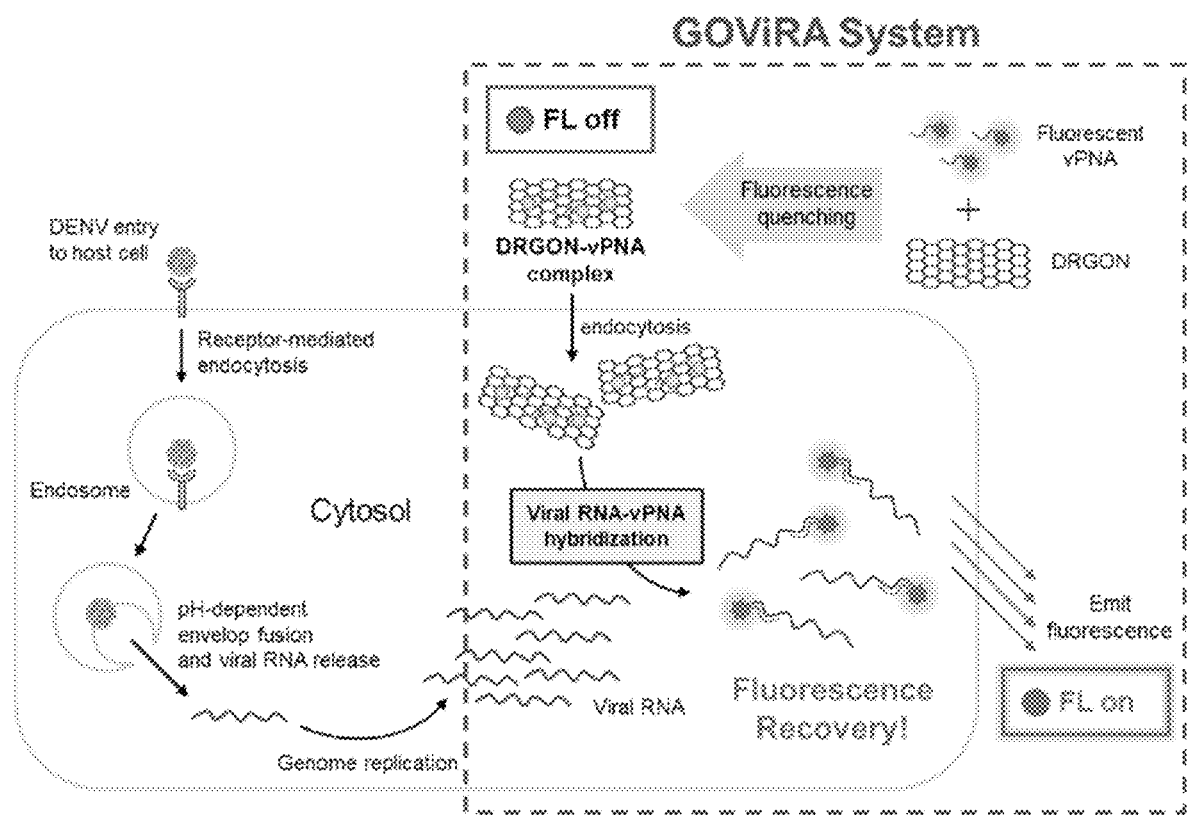
FIG. 3 is a schematic diagram showing a strategy for real-time DENV genome monitoring GOViRA platform.

In FIG. 3 of the present application, the quenching principle of a fluorescently-labeled probe by graphene oxide is schematically illustrated as an example of a system such as a Graphene Oxide-based Viral RNA Analysis system (GOViRA).

The genome of the virus may be DNA or RNA, for example, miRNA.

The probe may be a nucleic acid, and may include, for example, peptide nucleic acid (PNA).

The virus may be, for example, a dengue virus.

The sequence (C term→N term) of the PNA probe that specifically binds to the dengue virus may be, for example, or include CAGCAGGATCTCTGGTCT(SEQ ID NO: 9).

The genome of the virus may exist on a host cell of the virus. In this case, due to the small size of the graphene oxide and the hydrophobic region on the surface of the graphene oxide, the graphene oxide to which the probe is adsorbed passes through the cell membrane of the cell and enters the cytoplasm to access the target material, that is, the viral genome. Accordingly, the PNA probe attached to the surface of the graphene oxide may bind to the viral genome, which is the target material.

Measuring the fluorescence intensity enables, for example, quantitative real-time monitoring of intracellular viral RNA levels in the cells. Therefore, it is possible to effectively screen an infectious disease therapeutic agent or candidate substance for the virus.

Fluorescence emission of the fluorescent material may be detected by a flow cytometer (fluorescence activated cell sorting, FACS), a fluorescence reader, qRT-PCR (quantitative real-time PCR), a fluorescence microscope, or an in vivo imaging device, but it is not limited thereto. For example, the fluorescence reader may include a fluorescence microplate reader capable of measuring fluorescence ranging from about 230 nm to about 999 nm, but it is not limited thereto. For example, the fluorescence reader may be a device capable of selecting about three types of organic fluorescence dyes and observing the fluorescence signals thereof, so that a cross-talk phenomenon between fluorescence signals can be minimized. For example, the flow cytometer includes a device capable of observing a fluorescence signal of a cell while flowing a single cell into a tube. The fluorescence microscope includes those capable of observing intracellular, extracellular, or fluorescence of a sample, but it is not limited thereto.

The graphene oxide may be in the form of a sheet or particles. The sheet may be composed of a single layer or a plurality of layers. Further, the sheet shape may include a flat surface or a curved surface, and may exist in various forms. In one embodiment, the graphene oxide may be in the form of a two-dimensional single-layer sheet. Further, the particle shape may include various shapes such as a spherical shape, an elliptical shape, a rod shape, and a polygonal shape.

The graphene oxide may have a nano size. The size may be, for example, 5 to 500 nm, 5 to 200 nm, 5 to 150 nm, 5 to 100 nm, 5 to 50 nm, 10 to 500 nm, 10 to 200 nm, 10 to 150 nm, 10 to 100 nm, 10 to 50 nm, 20 to 200 nm, 20 to 150 nm, 20 to 100 nm, 20 to 50 nm, 30 to 200 nm, 30 to 150 nm, 30 to 100 nm, 30 to 50 nm, 50 to 200 nm, 50 to 150 nm, 50 to 100 nm, 50 to 80 nm, 60 to 200 nm, 60 to 100 nm, 60 to 80 nm, 80 to 200 nm, 80 to 150 nm, 80 to 100 nm, 90 to 200 nm, 90 to 150 nm, or 90 to 100 nm, but it is not limited thereto. The particle size is a value calculated by averaging the experimental values obtained through measurement using dynamic light scattering or the sizes shown in an atomic force microscope (AFM) or scanning transmission microscope (TEM) image. Such a particle size means a value obtained with assumption that the nano material has a spherical or circular shape.

As a specific example in the case of using nano-sized graphene oxide, graphene oxide may be conventional graphene oxide made of graphite powder, or graphene oxide nanocolloids made of graphite nanofibers.

The graphene oxide may be surface-modified with a water-soluble polymer.

The water-soluble polymer refers to a resin or polymer that can be dissolved in water or dispersed into fine particles in water. The water-soluble polymer may be a natural polymer, a semi-synthetic polymer or a synthetic polymer. The water-soluble polymer usable in the present invention may have a molecular weight of 1 to 20 kDa, 5 to 15 kDa, or 8 to 12 kDa. In one embodiment, the water-soluble polymer may be 10 kDa.

The water-soluble polymer may be selected from the group consisting of: chitosan and derivatives thereof; chitosan salts; dextran and derivatives thereof; hyaluronic acid and derivatives thereof; hyaluronate salts; pectin and derivatives thereof; pectin salts; alginates and derivatives thereof; alginic acid; agar; galactomannan and derivatives thereof; galactomannan salts; xanthan and derivatives thereof; xanthan salts; beta-cyclodextrin and derivatives thereof; beta-cyclodextrin salts; polyethylene glycol (PEG); polyethyleneimine (PEI), and combinations thereof. In one embodiment, the water-soluble polymer may be selected from the group consisting of dextran, polyethylene glycol, polyethyleneimine, and combinations thereof.

The water-soluble polymer and graphene oxide may be chemically or physically bonded. The chemical bond may be an amide bond, an ester bond, an ether bond, or the like, but it is not limited thereto. Further, the chemical bond may be achieved through a crosslinking agent. In one embodiment, the water-soluble polymer and graphene oxide may be coupled through EDC coupling. Further, the physical bond may be electrostatic attraction, hydrogen bond, or van-der-Waals bond, but it is not limited thereto. In addition, the graphene oxide surface-modified by the water-soluble polymer may have improved dispersion ability and stability, and enhanced biocompatibility.

The probe refers to a substance capable of specifically binding to a target material. In the present invention, the target material is, for example, a viral genome, and may be DNA or RNA. The probe may be applied without limitation as long as it is a material capable of binding thereto, and may be, for example, nucleic acid.

Since the peptide nucleic acid (PNA) is a single-stranded PNA, it may include one that is easily adsorbed to the surface of graphene oxide, but it is not limited thereto.

Since the main chain of oligonucleic acid is composed of peptide bonds and thus is electrically neutral, PNA has superior adsorption to graphene oxide having hydrophobic property compared to DNA or RNA, which is electrically negative. Further, PNA-RNA binding is stronger than DNA-RNA or RNA-RNA binding, and Tm value is higher by about 1° C. per base. Therefore, the PNA probe has superior binding ability with nucleic acid as a target material, compared to the DNA or RNA probe. Further, since PNA is very stable against nucleases or proteases present in the body, the possibility of loss of PNA probes is very low when PNA probes are introduced into cells, as compared to that of DNA, RNA or protein probes. Furthermore, since PNA is structurally composed of strong covalent bonds, it can maintain stability in various pH ranges and temperature conditions, and thus has excellent conditions compared to other types of nucleic acids as oligonucleic acids to be used as the probe.

Nucleic acids may be composed of 8 to 100, 8 to 90, 8 to 80, 8 to 70, 8 to 60, 8 to 50, 8 to 40, 8 to 30, 10 to 100, 10 to 90 10 to 80, 10 to 70, 10 to 60, 10 to 50, 10 to 40, 10 to 30, 12 to 28, 15 to 25, or 18 to 22 bases. However, the number of bases is not limited thereto as long as it can perform complementary binding to a target nucleic acid sequence. In one embodiment, the nucleic acid may consist of 15 to 22 bases.

A fluorescent material is bound to the probe. The fluorescent material is present in a state in which fluorescence energy is absorbed by graphene oxide and is quenched, and when the probe specifically binds to a target material and is released from graphene oxide, it exhibits fluorescence. The fluorescent material may be bound to one end or a middle of the probe. When the probe is a nucleic acid, the fluorescent material may be located at the 5' or 3' position of the nucleic acid or inside the nucleic acid. The fluorescent material may be directly bound to the probe or may be bound through a crosslinking agent.

The method may use two or more different probes to detect two or more target materials. In this case, the fluorescent material bound to each type of probe may be different.

The fluorescent material may be selected from the group consisting of fluorescein, fluorescein chlorotriazinyl, rhodamine green, rhodamine red, tetramethyl rhodamine, fluorescein isothiocyanate (FITC), oregon green, Alex Fluor, carboxyfluorescein (FAM), 6-carboxy-4',5'-dichloro-2',7'-dimethoxyfluorescein (JOE), carboxy-X-rhodamine (ROX), 6-carboxy-2',4,4',5',7,7'-hexachlorofluorescein (HEX), Texas red (sulforhodamine 101 acid chloride), 6-carboxy-2',4,7',7-tetrachlorofluorescein (TET), tetramethyl rhodamine-isothiocyanate (TRITC), carboxytetramethyl rhodamine (TAMRA), cyanine-based dyes, thiadicarbocyanine dyes, and combinations thereof. Further, the cyanine-based dye may be selected from the group consisting of Cy3, Cy5, Cy5.5, Cy7, and combinations thereof.

The method of the present invention may include treating the target viral genome with graphene oxide and a fluorescent probe having a binding ability to the genome of the target virus.

The probe before treatment may be adsorbed to the graphene oxide.

Hereinafter, the present invention will be described in more detail by way of the following examples in order to concretely describe the present invention.

EXAMPLE

Experimental Method

1. Reagents and Apparatus

Graphite nanofiber was purchased from Carbon Nanomaterials Technology. Potassium persulfate ($K_2S_2O_8$), phosphorus pentoxide ($P_2O_5$), and hydrogen peroxide (H2O2, 30%) were purchased from Junsei. Potassium permanganate (KMnO4) and ammonium hydroxide (NH4OH) were purchased from Sigma-Aldrich. Sulfuric acid (H2SO4) and hydrochloric acid (HCl) were purchased from Samchun chemical. Dextran was purchased from Fluka. Ribavirin and ulipristal were purchased from Sigma-Aldrich.

2. Synthesis and Characterization of DRGON

DRGON was synthesized according to previously published method (Lee, J. S., Kim, S., Na, H. K., Min, D. H., 2016. Adv Healthc Mater 5 (18), 2386-2395.). The height profiles were obtained by an atomic force microscope (AFM) NX-10 (Park Systems). FT-IR measurement was conducted by a FT-IR spectrometer NICoLET iS10 (Thermo Scientific). The UV-Vis absorbance spectra and PL spectra were obtained by the S-3100 (Scinco) and the ACTON SpectraPro 2150i spectrometer (Princeton Instruments), respectively. The X-ray diffraction (XRD) patterns were obtained using a D8 Advanced (Bruker) system with Cu-Kα radiation (1.54 Å). Raman spectra were obtained by LabRAM HR UV/vis/NIR (Horiba Jobin Yvon) with an Ar ion CW laser (514.5 nm) as an excitation source focused through a BXFM confocal microscope with an objective lens (50×, numerical aperture=0.50). The average particle size and zeta potential were measured with the Zetasizer Nano S DLS analyzer (Malvern Panalytical). The TEM images were acquired using a H-7600 (Hitachi) at 100 kV. Energy-dispersive X-ray spectroscopy (EDS) analysis was performed by JEM-F200 (JEOL Ltd).

3. Quenching and Recovery of the Fluorescence Signal of PNA Probe Using DRGON First, 20 pmol Cy5-labeled PNA probe (Panagene) was mixed with an increasing amount of DRGON in 1× PBS and incubated for 10 min at RT. The fluorescence intensity of Cy5 (Ex/Em=650/670 nm) was measured after the formation of the PNA-DRGON complex. To evaluate the specificity of the PNA-DRGON complex, single-stranded RNA (Bioneer) was added to the complex. The fluorescence signal was monitored by SynergyMx (Biotek).

4. Cell Culture and Viruses

Vero E6 was provided by Professor K. Ahn from the Department of Biological Sciences, Seoul National University. The Vero E6 and Huh7 (Korean Cell Line Bank, 60104) cells were maintained in DMEM supplemented with 10% fetal bovine serum (FBS) and P/S. A549 (ATCC, CCL-185) cells were maintained in RPMI supplemented with 10% FBS and P/S. DENV serotype 1 (DenKor-07) was purchased from the National Culture Collection for Pathogens, Korea. DENV serotype 2, 3, 4, and JEV (KBPV-VR-29, KBPV-VR-30, KVPV-VR-31, and KBPV-VR-27) were purchased from the Korea Bank for Pathogenic Viruses. ZIKV (Zika/Brazil/16321) was purchased from the Virus Research and Testing Center, Korea. DENV, ZIKV, and JEV were amplified in the Vero E6 cells with DMEM supplemented with 2% FBS and P/S. The cells were inoculated with a MOI of 0.05. The virus-containing media was cleared by centrifugation at 2000 g for 10 min, and aliquots were stored at −80° C.

5. Focus-Forming Assays (FFA)

The virus was titrated by FFA in Vero E6 cells. Ten-fold serial diluted virus in DMEM supplemented with 2% FBS and P/S was added onto confluent Vero E6 cell monolayers attached to 96-well, black wall, optical bottom plates (Corning) and incubated for 1 h. After the incubation, the wells were overlaid with 100 μL of DMEM with 10% FBS, P/S, and methylcellulose and incubated for 2 days. Following the incubation, cell monolayers were fixed with 4% paraformaldehyde and then treated with blocking solution for 1 h. Samples were then treated with the anti-Dengue virus E protein antibody (GeneTex, GTX127277), followed by FITC-labeled goat anti-mouse IgG secondary antibody (Sigma-Aldrich, F0257).

6. Live-Cell Imaging

Vero E6 cells were seeded onto 96-well, black wall, optical bottom plates at a density of 1.5×104 cells per well and incubated with DMEM supplemented with 10% FBS and P/S. After overnight incubation, the cells were briefly washed with 1× PBS and infected with DENV. Next, 20 pmol vPNA or β-actin PNA probe was mixed with 1.2 μg DRGON solution for 10 min at RT. The Vero E6 cells were treated with the PNA-DRGON complexes for 5 h. The plates were incubated for up to 72 h, and cell nuclei were counterstained with Hoechst 33342. Fluorescent images were obtained by the IN Cell Analyzer 2000 (GE Healthcare) and DeltaVision Elite (GE Healthcare) imaging system. The quantification of data was processed with the IN Cell Developer software (https://cyvitalifesciences.com).

7. Cell Viability Test

The CCK-8 assay was performed according to the manufacturer's instructions. Vero E6, Huh7, and A549 cells were seeded in 96-well culture plates with 100 μL of complete media. After 24 h of incubation, the cells were treated with nanomaterials or drug in serially diluted concentrations for 48 h. The cells were rinsed with 1× PBS twice, and CCK-8 reagent was treated at a concentration of 10% (v/v) and incubated for 1 h. The optical density at 450 nm was measured by SynergyMx (Biotek) in the absorbance mode.

8. qRT-PCR Analysis

Total RNA was extracted using Trizol (Invitrogen). The cDNA samples were prepared by reverse transcription using SuperScript II Reverse Transcriptase (Invitrogen). The synthesized cDNA samples were subjected to qRT-PCR with primers specific for each gene by using the PowerUp SYBR Green Master Mix (Applied Biosystems) and CFX Connect (Bio-Rad). Primer sequences were confirmed shown in Table 1.

TABLE 1

Primer sequences for qRT-PCR analysis.

| Primers | Sequence (5'→3') |
|---|---|
| DENV forward | GCTCCTTCAATGACAATGCGCTGTA (SEQ ID NO: 1) |
| DENV reverse | CCTGAAACCCCTTCCACGAAGTC (SEQ ID NO: 2) |
| β-actin forward | CGGGAAATCGTGCGTGAC (SEQ ID NO: 3) |
| β-actin reverse | ATGCCCAGGAAGGAAGGTTG (SEQ ID NO: 4) |
| Human GAPDH forward | TCACTGCCACCCAGAAGACTG (SEQ ID NO: 5) |
| Human GAPDH reverse | GGATGACCTTGCCCACAGC (SEQ ID NO: 6) |
| Mouse GAPDH forward | TGACCTCAACTACATGGTCTACA (SEQ ID NO: 7) |
| Mouse GAPDH reverse | CTTCCCATTCTCGGCCTTG (SEQ ID NO: 8) |

9. Drug Library Screening

For the drug library screening experiments, 1.5×104 Vero E6 cells in a total volume of 100 μL per well were seeded onto 96-well, black wall, optical bottom plates using DMEM media supplemented with 10% FBS and P/S and incubated overnight. Next, the cells were pretreated with 50 μL of experimental compounds or vehicle in DMEM supplemented with 2% FBS and P/S and incubated 1 h at 37° C. Next, 50 μL of DENV (a final MOI of 0.5) were added to each well, resulting in a 10 μM final concentration for each compound and cells were incubated for 48 h.

Infection was stopped by rinsing each well with 1× PBS, and the infected cells were treated with the PNA-DRGON complexes for 5 h at 37° C. and then briefly washed with 1× PBS. Fluorescent images were obtained by the IN Cell Analyzer 2000, and quantification of the data was processed using the IN Cell Developer software.

10. Animal Experiments

AG129 mice (8-10 weeks old, female) were purchased from Marshall BioResources and housed under pathogen-free conditions. Animal research was approved by the Institutional Animal Care and Use Committee of Seoul National University and was performed according to the guidelines of the recommendations from the Association for Assessment and Accreditation of Laboratory Animal Care.

11. Murine DENV Infection Model

The murine DENV infection model was as described in previous study (Park, S. J., Kim, J., Kang, S., Cha, H. J., Shin, H., Park, J., Jang, Y. S., Woo, J. S., Won, C., Min, D. H., 2020. Sci Adv 6 (22), eaaz8201.). AG129 mice were exposed with a target dose of 107 FFU of the DENV by intraperitoneal injection. One hour after the challenge, the animals were treated with ulipristal. The compound was dissolved in sesame oil at a 10× concentration and further diluted in 1× PBS. Ulipristal was administered to the animals by intraperitoneal injection.

Animals in the vehicle control groups were administered a solution with no drug. The animals were monitored for weight, morbidity (ruffled fur, hunched posture, etc.), and survival daily for a total of 14 days after infection. Mice with a weight <80% of their initial body weight were humanely euthanized. At 3 days p.i., mice were sacrificed from each group. Blood and organ samples were collected. Blood was clarified by centrifugation, and viremia was determined by qRT-PCR. Organs were homogenized, and total RNA was extracted using Trizol. The relative DENV RNA level from each organ was determined by qRT-PCR. Primer sequences were confirmed shown in Table 1.

12. Hematoxylin and Eosin (H&E) Staining

Organ samples were fixed with 4% paraformaldehyde and embedded in paraffin. Paraffin sections were stained with H&E at the pathology core facility in the Center for Medical Innovation, Seoul National University Hospital, Korea.

13. Time-of-Addition Assay

A549 cells were seeded onto 24-well plates. After incubation overnight, cells were treated with ulipristal at the various time points and inoculated with DENV. At 48 h p.i., the cells were washed with 1× PBS and processed for qRT-PCR.

14. Statistics

Statistical analysis was conducted using the GraphPad Prism software as described in the indicated figure legends. Statistical significance was assigned when the value of P was <0.05. Error bars indicate the SEM and the number of n indicated in the figure legends.

Experimental Results

1. Characterization of DRGON

We synthesized DRGON by reducing GON with dextran, a biocompatible polysaccharide polymer. AFM analysis with the corresponding height profile shows the thickness of DRGON to be ~6.20 nm which is thicker than that of GON (FIG. 1A). The increase in the height of DRGON is attributed to the dextran coating acquired during the reduction process on the surface of GON.

The FT-IR spectrum of DRGON showed a decreased intensity of the C=O bond stretching peak at 1720 cm−1 compared to the spectrum of GON (FIG. 1B). The decrease in the number of carbonyl groups indicates the successful synthesis of DRGON by the reduction process.

The UV-Vis spectra of GON showed an absorption peak at around 230 nm that is due to the π→π* transitions of the aromatic C=C bonds and a shoulder at around 305 nm assigned to the n→π* transitions of the C=O bonds (FIG. 1C). The UV-Vis absorption spectra of DRGON showed a red shift from 230 nm to 245 nm implying a complete reduction and restoration of the C=C bonds. The n→π* transition absorption peak was diminished in the absorption spectra of DRGON because the C=O bonds were significantly reduced during the reduction process. The UV-Vis absorption spectra were in a good agreement with the FT-IR results.

This observation was further supported by the PL spectra. The PL spectra of GON and DRGON were obtained using an excitation wavelength of 300 nm (FIG. 1D). The strong emission peak at 430 nm is ascribed to the π*→n transition that is associated with the aromatic C=C bonds. The peak on the right was attributed to the disorder-induced defect states within the π→π* gap. The intensity of the peak induced by defect states significantly decreased in the PL spectrum of DRGON implying a significant increase in the formation of sp2 domains during the reduction process.

The crystal structures of GON and DRGON were characterized by XRD analysis (FIG. 1E). GON exhibited a graphitic peak at 2θ=10.8 with a d-spacing value of 8.2 Å. Although this peak did not appear in the XRD pattern of DRGON, a new peak was observed at 2θ=18.5 with a dspacing value of 4.8 Å. The significant reduction in the interlayer distance of DRGON compared to that of GON was due to the removal of the oxygen groups through the reduction process.

The Raman spectra showed D and G bands that are typically found in carbon materials (FIG. 1F). The integrated intensity ratio of the D and G bands (ID/IG) was increased from 0.82 to 0.86. The average hydrodynamic diameters of GON and DRGON measured by DLS was 34.0±0.5 nm and 48.2±0.8 nm, respectively (FIG. 1G). The lateral dimension of DRGON from the TEM images was smaller than 100 nm (FIG. 1H) and we found a good correlation between the hydrodynamic diameters measured by the DLS and the particle dimension as measured by TEM.

Figure 2B:
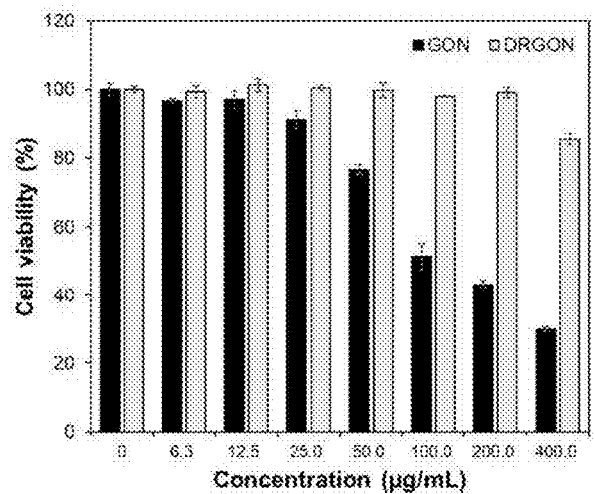
FIG. 2B shows the cell viability of Vero E6 cells treated with GON or DRGON serially diluted for 48 hours. Values represent mean±SEM (n=3).

The elemental analysis of DRGON was investigated using EDS (FIG. 1I) and the zeta potential of DRGON was −38.0±0.3 mV. Overall, analytical data indicate the successful synthesis of DRGON. Graphene-related nanomaterials enter cells by endocytosis, and the dispersibility of the particles strongly modulates their cellular uptake. The instability of graphene oxide-based nanomaterials in physiological solutions limits their application in biological areas. To investigate the stability of GON, DRGON and PNA-DRGON complex, we dispersed nanoparticles in 1× PBS solution and complete media (FIG. 2A). DRGON and PNA-DRGON complex maintained its suspension both in 1× PBS solution and complete media for 24 h without showing visible aggregation. On the other hand, GON showed particle aggregation and precipitation in both solutions after 1 h. Moreover, no obvious toxicity was measured with DRGON (FIG. 2B). Even at a high concentration of 400 μg/mL, the cell viability remained 85% which is significantly higher than that with GON. These results show that the dextran coating effectively improved the colloidal stability in physiological solutions and reduced its cytotoxicity. Furthermore, these results demonstrate that DRGON is suitable for biological applications.

2. Design for the GOViRA, a Fluorescence-Based DENV Detection Assay

We then prepared a fluorogenic PNA probe with high selectivity to the DENV genome. Conserved in all four serotypes of DENV but not in other *Flaviviruses,* a region in the 3' untranslated region (UTR) of the viral genome was chosen as the targeting domain of the PNA probe. The PNA probe composition was designed with practical considerations such as probe length, purine content, and intramolecular binding to improve the solubility of the PNA and to reduce the self-aggregation problem. The PNA probe that was complementary to the selected region of the viral genome was named as vPNA and conjugated with Cy5.

TABLE 2

PNA sequences corresponding to each target.

| Target | PNA sequence (C term→N term) |
|---|---|
| DENV | CAGCAGGATCTCTGGTCT (SEQ ID NO: 9) |
| Scrambled | ATCGAATAGTCTGACTACAACT (SEQ ID NO: 10) |
| ß-actin | ATCTTGATTTTCATCGTGC (SEQ ID NO: 11) |

Figure 4A:
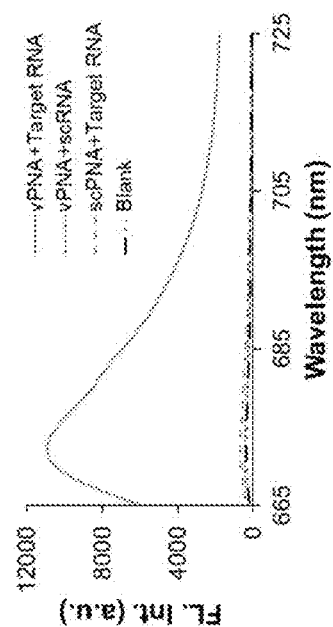
Figure 4B:
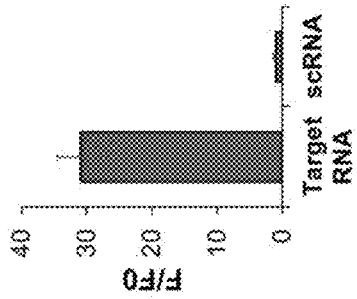
Figure 4C:
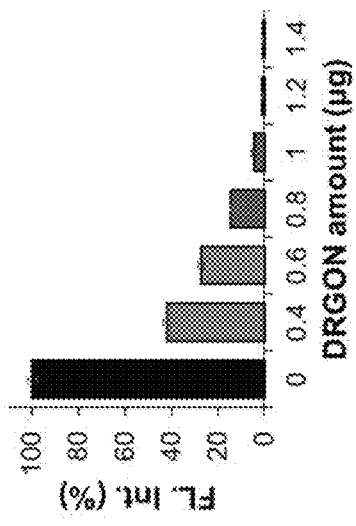
Figure 4D:
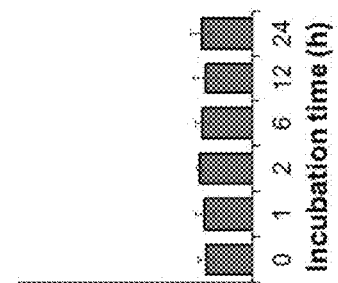
Figure 4E:
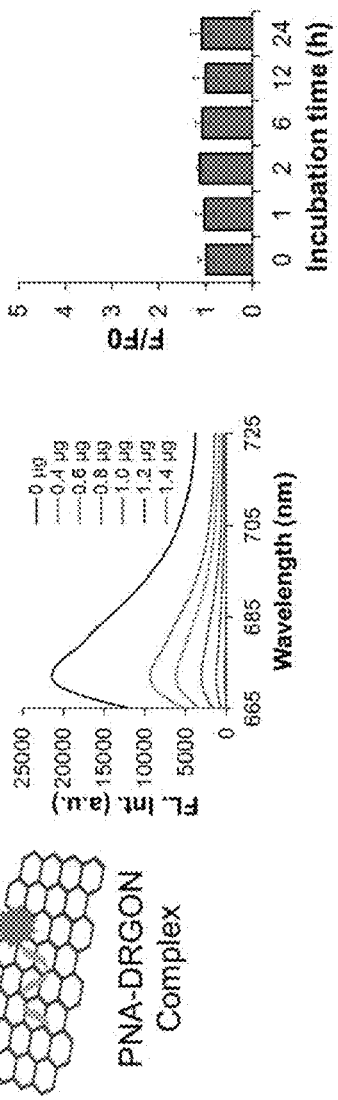

For the development of the GOViRA (FIG. 3), fluorescence quenching and recovery tests were performed using the prepared DRGON and vPNA probe (FIG. 4A). The fluorescence intensity was quenched down to 1% compared to the initial value when 1.2 μg of DRGON were added to 20 pmol of Cy5-labeled vPNA and it maintained its fluorescence intensity for 24 h in the presence of serum (FIGS. 4B, 4C and 4E). The recovery of the fluorescence was measured using a chemically synthesized single-stranded RNA with the target sequence. The quenched fluorescence of vPNA was recovered when the target RNA was added. To examine the selectivity of the GOViRA system, Cy5-labeled scPNA was prepared with a randomly scrambled, mismatching sequence (Table 2).

Figure 4F:
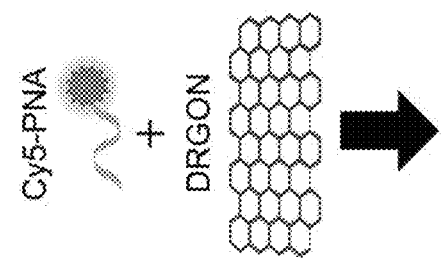

No fluorescence signal was observed from the scPNA-DRGON complex in the presence of the target RNA. Additionally, when a scrambled sequence of RNA was mixed with the vPNA-DRGON complex, there was no notable observation of fluorescence recovery as well (FIGS. 4D and 4F). These results indicate that the GOViRA system is highly stable and works only in a sequence-specific manner.

3. Validation of the GOViRA System in Living Cells

To investigate the ability of the GOViRA system to visualize DENV infection in live cells, we inoculated Vero E6 cells with DENV serotype 2 for 48 h and then treated them with PNA-DRGON complexes consisting of vPNA or scPNA for the next 5 h. For relative quantification, a PNA probe complementary to β-actin was conjugated with Cy3 to be used as an internal control. As the intracellular viral genome was replicated after the inoculation, DENV-infected Vero E6 cells displayed a distinct fluorescence signal in the cytoplasm after the addition of the vPNA-DRGON complex, whereas that of the non-infected cells showed no fluorescence signal. In contrast, the treatment of the DENV-infected cells with the scPNA-DRGON complex did not lead to any signs of a fluorescence response (FIGS. 5A and 5B), indicating a high target specificity for the GOViRA system in living cells. When we investigated the zsectioned image in the same plane, the Cy5 signals from the vPNA probe (labeled in red) were mostly observed in the cytoplasmic area (FIG. 5D).

Additionally, to verify the reliability of the GOViRA system, the number of viral RNA copies in the cytoplasm was quantified by qRT-PCR under the same experimental conditions. A high amount of viral genome was detected only in the DENV-infected cells (FIG. 5C), which was highly correlative to the results analyzed from the fluorescence signal.

Figure 6:
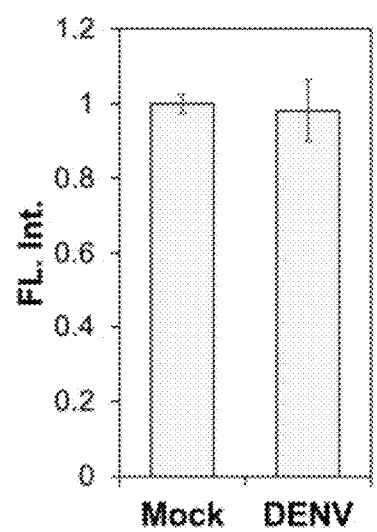
FIG. 6 shows the quantitative detection of intracellular β-actin through the GOViRA system in uninfected and DENV infected Vero E6 cells.
Figure 7:
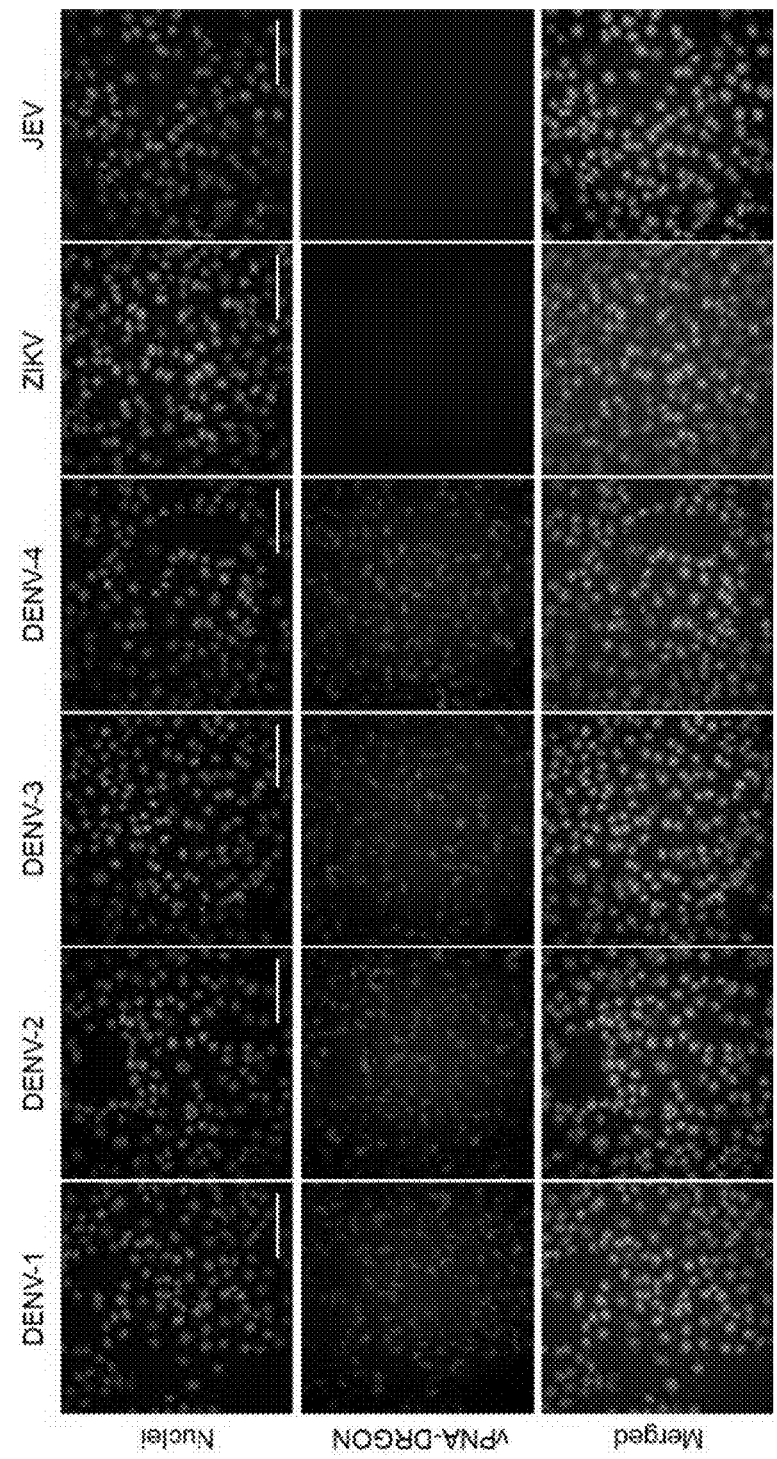
FIG. 7 shows the distinction between DENV and other Flaviviruses using the GOViRA system, wherein Vero E6 cells were infected with DENV serotypes 1, 2, 3, 4 and other Flaviviruses (ZIKV and JEV). PNA-DRGON complexes were simultaneously treated at 72 h p.i. Scale bar: 25 μm. (Red, Cy5 signal from the PNA probe, blue from the nucleus, Hoechst signal).

Furthermore, the quantified fluorescence signal corresponding to β-actin remained constant indicating that the β-actin is a suitable internal control (FIG. 6). DENV exists as multiple serotypes which exhibit partially conserved sequences. When the sequence of vPNA was designed, the conserved region in all four serotypes was set as a target. To verify the capability of monitoring DENV infection for all four serotypes, the inoculation of DENV serotype 1, 2, 3, or 4 was followed by vPNA-DRGON treatment. Regardless of the serotype, the DENV-infected groups showed a notable fluorescence signal in response to the vPNA-DRGON treatment, whereas those infected with other *Flaviviruses* did not (FIG. 7). These results indicate that the GOViRA system possesses a great specificity against DENV regardless of the serotype, suggesting that this system could also be used to distinguish the infection of DENV from other *Flaviviruses*.

Figure 8A:
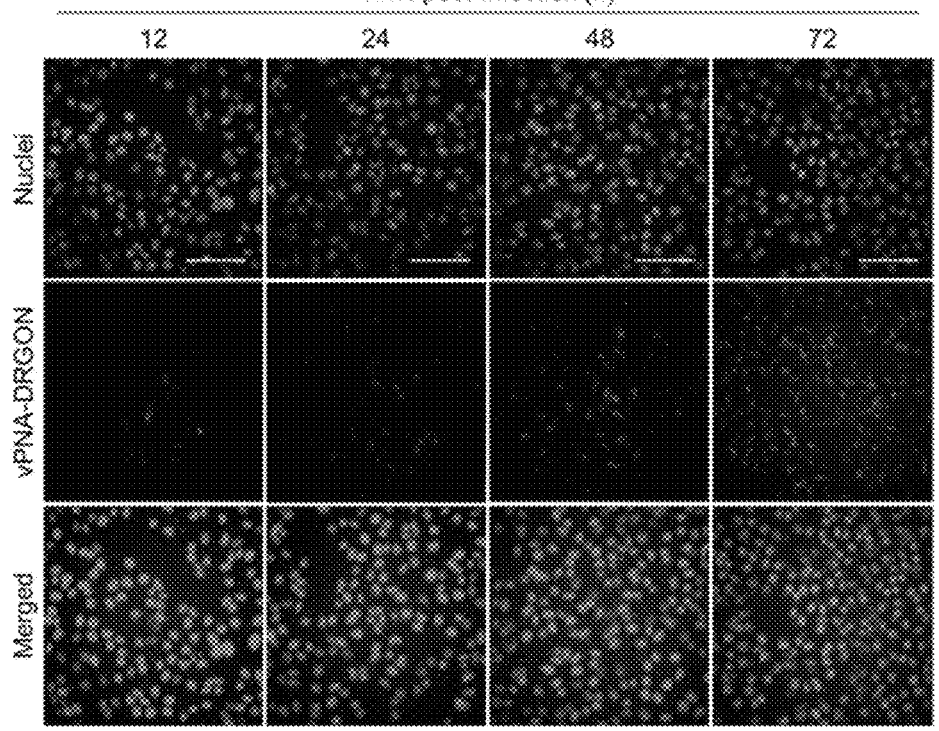
Figure 8B:
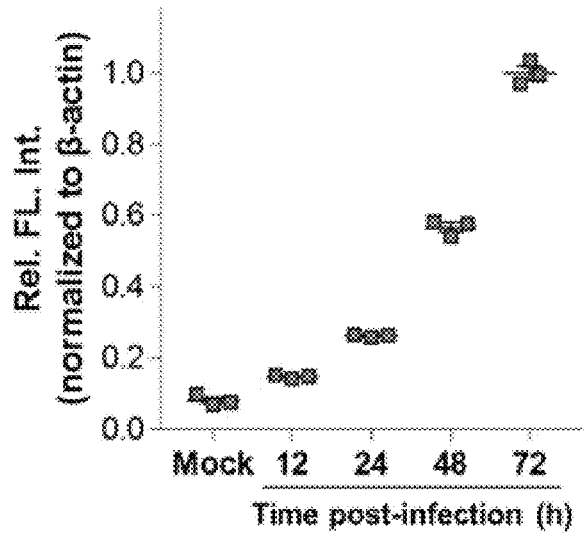
Figure 8C:
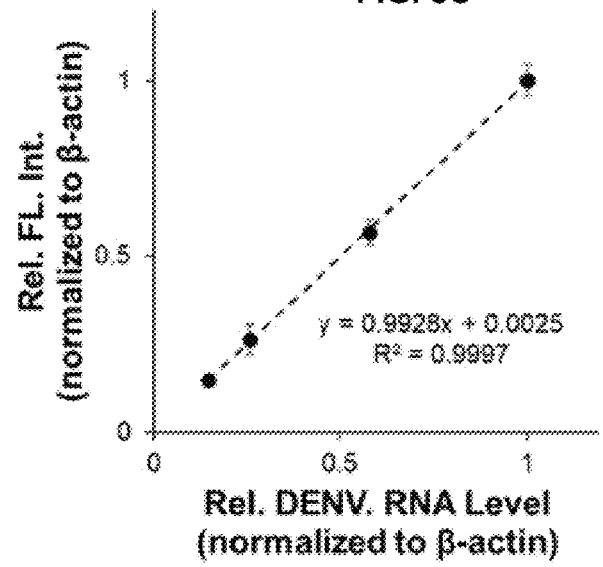
Figure 9A:
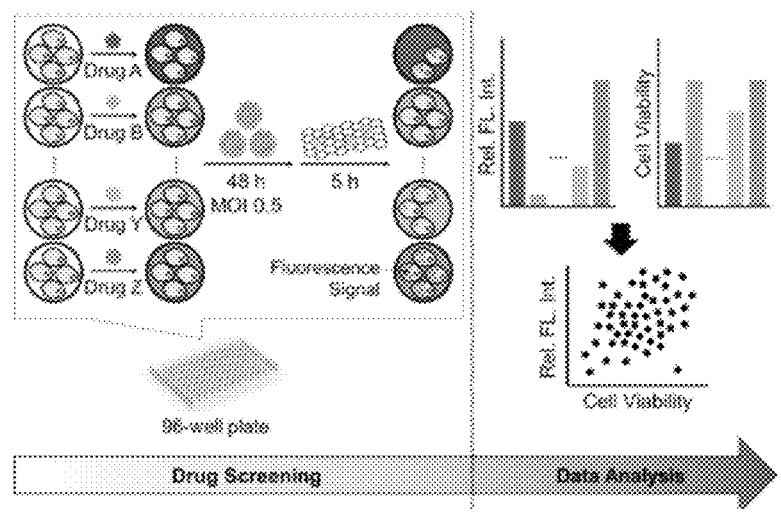
Figure 9B:
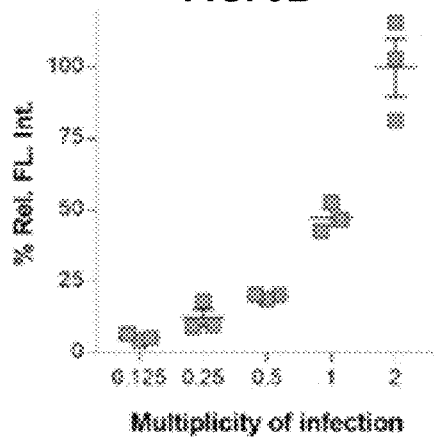

To determine the capacity of the GOViRA system measuring the dynamic changes in intracellular viral RNA expression levels and monitoring the progress of the viral infection, we monitored the changes in the fluorescence intensity over time. Vero E6 cells inoculated with DENV were treated with the PNA-DRGON complex at a series of time intervals from 12 to 72 h post-infection (p.i.) (FIG. 8A). As shown in FIG. 8B, the fluorescence signal from the cells showed a time-dependent increase, with a high linear correlation ($R2=0.9997$) to the result from the qRT-PCR analysis. Next, Vero E6 cells were inoculated with DENV at various multiplicities of infection (MOI) from 0.25 to 2, and the cells were monitored by live-cell microscopy. The quantified fluorescence signal increased in an MOI-dependent manner (FIG. 9B). Such data suggest that the GOViRA platform facilitates not only real-time visualization of DENV-infection but also quantitative analysis of intracellular viral RNA in living cells.

Figure 9C:
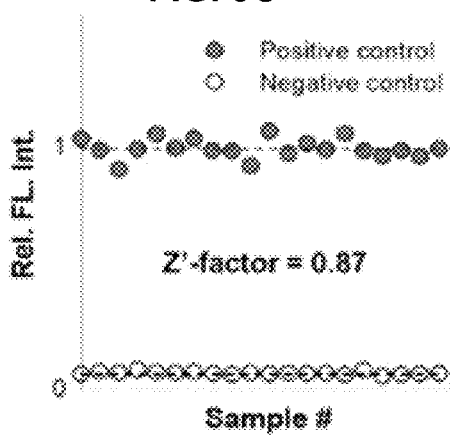
Figure 9D:
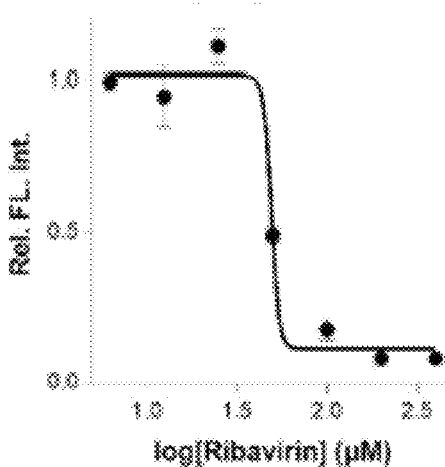

4. High-Throughput Screening of Approved Drugs to Identify Compounds with Anti-DENV Activity Because the GOViRA platform with living cells was successfully demonstrated, we then tried to verify whether the GOViRA platform is suitable for high-throughput screening. To determine its systemic reliability as a high-throughput screening assay, we used Z'-factor as a statistical parameter. The Z'-factor of the GOViRA platform was calculated to be 0.87 from 20 negative and 20 positive controls (FIG. 9C), which can be suggested as evidence of an excellent assay for high-throughput screening. To further verify whether the GOViRA system is capable of the quantitative analysis of antiviral activity, we utilized the system to investigate the cellular effect caused by a model representative antiviral compound, Ribavirin. The introduction of the ribavirin induced a serial decrease in the fluorescence signal dose-dependently (FIG. 9D), indicating that the GOViRA system is suitable as a fluorescence-based quantitative antiviral assay.

Figure 9E:
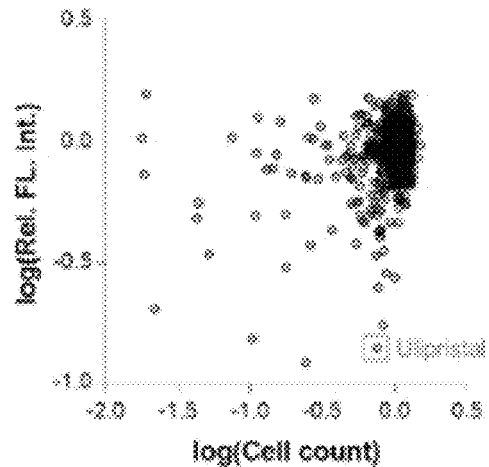
Figure 10A:
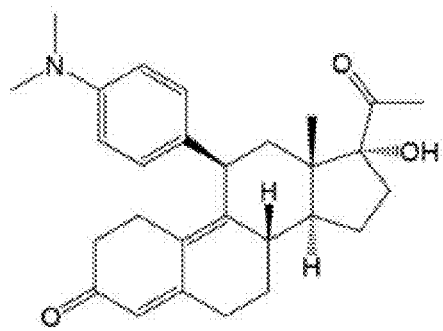

Using the GOViRA system, we conducted a cell-based screening on a library of ~550 FDA-approved drugs to find therapeutic candidates with anti-DENV activity. Vero E6 cell monolayers were treated with 10 μM of each drug in the library or with the vehicle (DMSO) for an hour before infection. Then, DENV and the PNA-DRGON complex were sequentially introduced (FIG. 9A). Based on the screening results that considered both antiviral activity and cell viability (FIG. 9E), we chose ulipristal as a potent antiviral candidate because it showed fluorescence signal decrease by <25% and minimal effects on cell viability (FIG. 10A).

5. Ulipristal Inhibits DENV Infection In Vitro

Standard assays were done to check the antiviral effect and cytotoxicity of ulipristal in vitro. The activity of ulipristal against DENV was evaluated by both FFA and qRT-PCR. For the FFA, Vero E6 cells were infected with DENV in the presence of various concentrations of ulipristal.

Figure 10B:
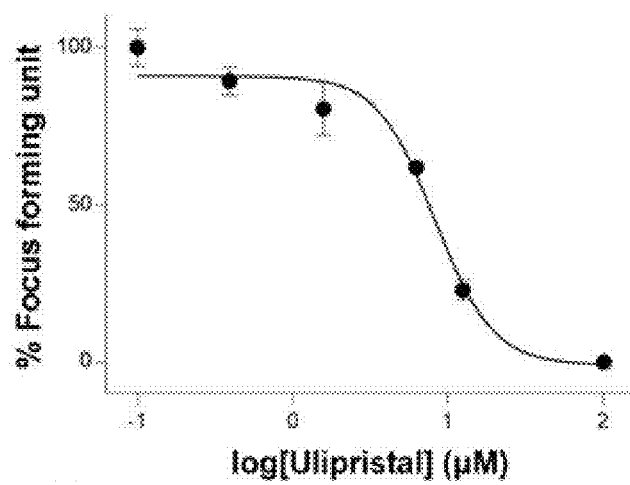
Figure 10C:
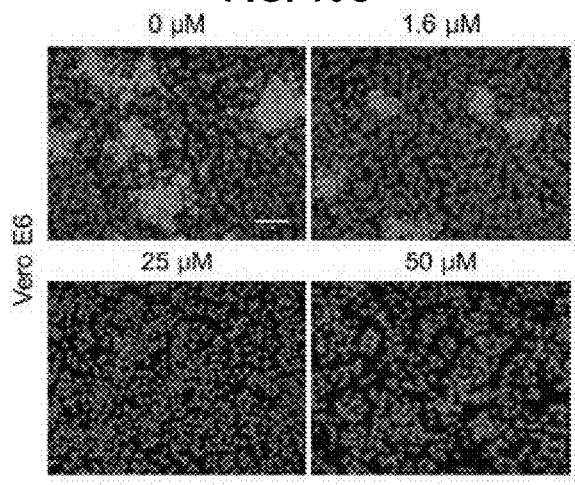
Figure 10D:
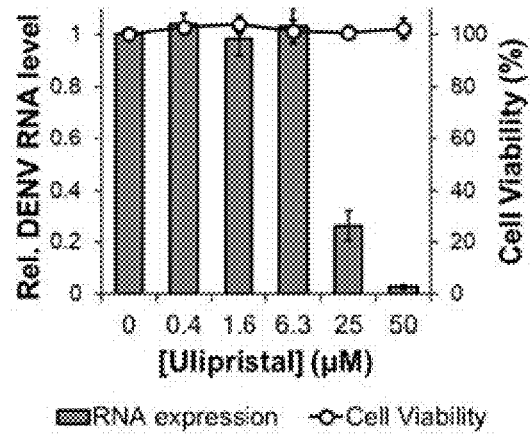

The anti-DENV activity was assessed by immunostaining with antibodies specific to the DENV E protein. As the number of foci decreased in a dose-dependent manner, FFA demonstrated that the compound does have an antiviral effect against DENV in the Vero E6 cells (FIG. 10C), and the half-effective concentration (EC50) was 8.3±0.1 μM (FIG. 10B). The relative expression level of viral RNA confirmed that ulipristal was active against DENV and correlated with the FFA. The cytotoxicity of the compound in the Vero E6 cells was determined by the CCK-8 assay. Ulipristal showed no impact on cell viability in the Vero E6 cells (FIG. 10D).

We further validated the antiviral activity of ulipristal using Huh7 (liver carcinoma cell line) and A549 (lung carcinoma cell line) cell lines as hosts for the DENV infection. Both cell monolayers were analyzed with qRT-PCR to observe the relative DENV RNA level. The ulipristal treatment inhibited the DENV infection in both cell lines dose-dependently (FIGS. 11A and 11B). Moreover, the fluorescence signal of the viral E protein from immunostaining also was reduced by the ulipristal treatment (FIG. 11C). These results indicate that ulipristal effectively inhibits DENV infection in vitro.

6. Anti-DENV Effect of Ulipristal in Murine DENV Model

To confirm the antiviral activity of ulipristal in an in vivo DENV infection, this compound was evaluated in a murine DENV infection model. The DENV strain we used (KBPV-VR-29) has been reported as a mouse-adapted virus strain. For our study, AG129 mice, deficient in the interferon (IFN)-α/β and -γ receptors, were infected with the DENV by intraperitoneal injection at an exposure dose of 1×107 FFU which shows lethality approximately within ~10 days. One hour after the infection, the animals were treated with ulipristal or vehicle over 14 days, and survival was monitored during that period.

Ulipristal was given at a dose of 15 mg/kg every day through intraperitoneal injection. The dose was determined based on the reported rodent toxicity study (Pohl, O., Harvey, P. W., McKeag, S., Boley, S. E., Gotteland, J. P., 2013. Curr. Drug Saf. 8 (2), 77-97.) and our results from the in vitro drug validation. We attempted to select a dose that would prevent toxicity but could achieve enough plasma concentration to observe an antiviral effect.

To examine whether ulipristal treatment can relieve the symptoms in the murine DENV model, the individual mice were weighed and visually monitored for morbidity daily. Compared to the ulipristal-treated group, the control group exhibited a huge weight loss (FIG. 12A) and disease symptoms including ruffled fur, hunched posture, and decreased mobility (Shresta, S., Sharar, K. L., Prigozhin, D. M., Beatty, P. R., Harris, E., 2006. J. Virol. 80 (20), 10208-10217.). Ulipristal treatment in the infected mice also resulted in a statistically significant survival benefit (P=0.0007) shown in the survival plot (FIG. 12B). Next, we verified the systemic and local antiviral effect of ulipristal. On day 3 p.i., the ulipristal-treated group showed a significantly reduced viremia in the blood compared to that of the control group (FIG. 12C). To assess the local therapeutic effect, the viral RNA expression level in five representative organs (spleen, lung, liver, small intestine, and large intestine) and the tissue morphology were investigated. The viral RNA load in each organ of the ulipristal-administered mice was significantly decreased consistent with the viremia in the blood, although the differences between the viral RNA loads in the small intestine of the vehicle and ulipristal-treated groups were not statistically significant (FIG. 12D). To further determine the histological differences, representative tissue samples from each group were examined.

Hematoxylin and eosin (H&E)-stained sections of the spleen and liver from each group were analyzed (FIG. 12E). As shown in the uninfected control group, a normal spleen shows a distinguishable white-pulp and red-pulp structure, which is severely ruptured after the virus infection (DENV infected, vehicle-treated group). It was observed that such a boundary loss was decreased in the ulipristal-treated group, indicating that the administration of ulipristal may relieve the virus infection-associated spleen damage. Moreover, several notable changes were also observed in the liver tissues as well. Pathological features of DENV infection include nuclear pleomorphism of hepatocytes, dilatation of sinusoids, and focal necrosis (labeled with black arrows). Compared to the control group, a significant reduction of such symptoms was observed in the ulipristal-treated group. Taken together, the overall data indicate that ulipristal may contribute to reducing the symptoms of DENV infection, resulting in a significant survival benefit in vivo.

7. Mode of Action of Ulipristal is Mediated by Inhibiting Viral Entry

Figure 13:
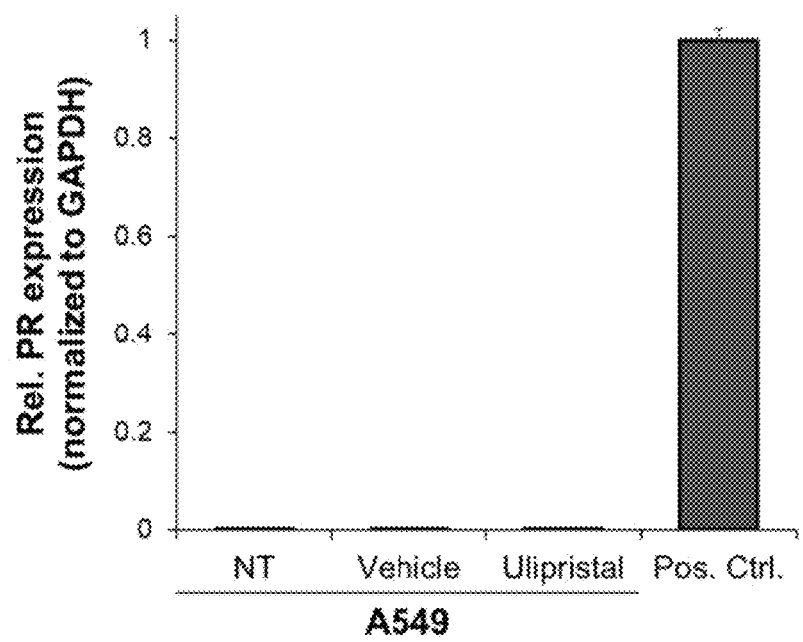
FIG. 13 shows the effect of ulipristal on PR expression. qRT-PCR analysis of PR expression in three groups of A549 cells: untreated (NT), vehicle treated and ulipristal treated groups. Values represent mean±SEM (n=3).

A time-of-addition experiment was performed to determine which time point of the viral infection stage is affected by the administration of ulipristal. Because ulipristal is widely known as an SPRM compound, we chose a cell line without PR expression to exclude the influence of PR signaling on the time-of-addition experiment. PR expression was observed in three groups of A549 cells: no treatment (NT), vehicle treatment, and ulipristal treatment group. After 24 h of incubation, the RNA expression level of each group was analyzed. There was no PR expression in the NT group (FIG. 13). Additionally, the vehicle or ulipristal treatment did not influence the levels of PR expression in the A549 cells. Therefore, we examined the mode of action of ulipristal using the A549 cell line.

Figure 14A:
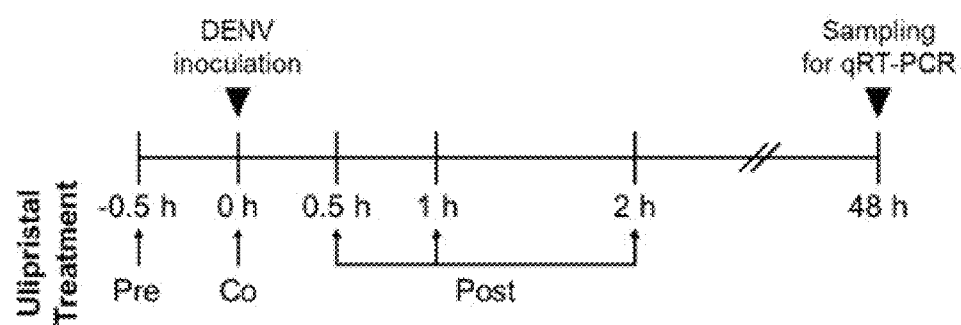
Figure 14B:
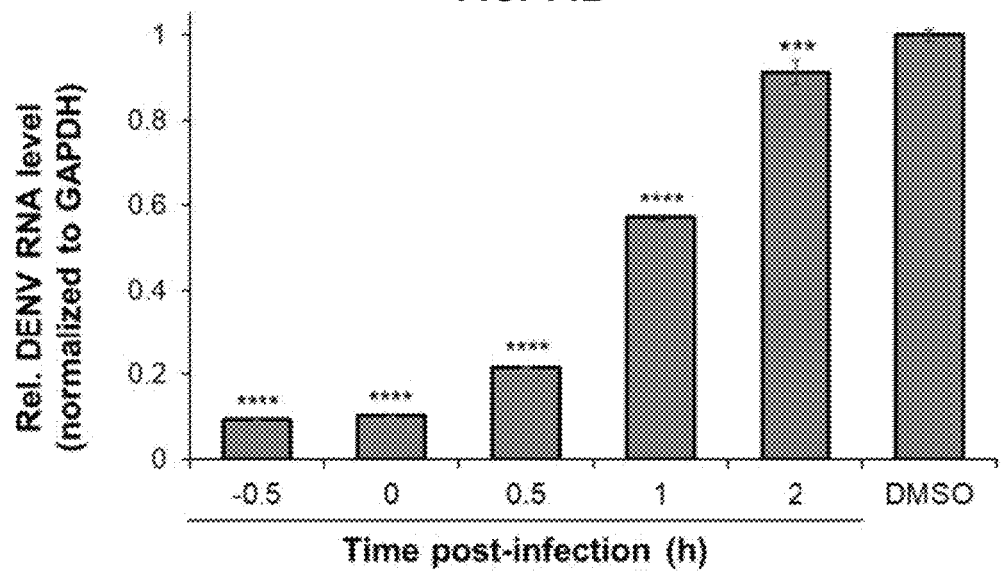

A549 cells were treated with ulipristal in three different conditions: treatment before the infection (pre-treatment), treatment along with the infection (co-treatment), and treatment after the infection (post-treatment) (FIG. 14A). The antiviral effect by the administration of the drug was observed in the pre-treatment and co-treatment groups. However, a less inhibitory effect was observed when ulipristal was added after the virus inoculation. Furthermore, the degree of inhibitory effect was decreased as the ulipristal administration was delayed (FIG. 14B). Taken together, the inhibitory kinetics of ulipristal suggest that ulipristal inhibits viral infection at the entry stage of the DENV life cycle and acts as an endocytic inhibitor.

REFERENCE TO AN ELECTRONIC SEQUENCE LISTING

A sequence listing electronically submitted on Aug. 17, 2023 as ASCII text file named 20230817_LC0602312_TU_SEQ.TXT, created on Aug. 16, 2023 and having a size of 2,212 bytes, is incorporated herein by reference in its entirety.

What is claimed is:

1. A method for treating dengue fever, the method comprising administering to a subject in need there of a composition comprising a compound represented by Formula 1 or a pharmaceutically acceptable salt thereof:

[Formula 1]

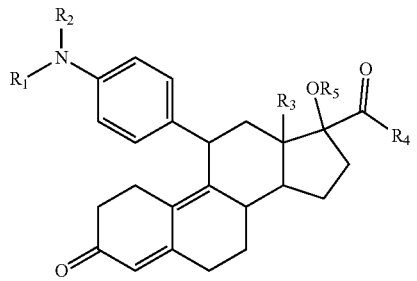

wherein $R_1$ to $R_4$ are each independently an alkyl group having 1 to 5 carbon atoms; and
$R^5$ is hydrogen or an acetyl group.

2. The method according to claim 1, wherein $R_1$ to $R_4$ are methyl.

3. The method according to claim 1, wherein the dengue fever is caused by infection with dengue virus DENV-1, DENV-2, DENV-3 or DENV-4.

* * * * *

SEQUENCE LISTING

<160> NUMBER OF SEQ ID NOS: 11

<210> SEQ ID NO 1
<211> LENGTH: 25
<212> TYPE: DNA
<213> ORGANISM: Artificial Sequence
<220> FEATURE:
<223> OTHER INFORMATION: primer

<400> SEQUENCE: 1
gctccttcaa tgacaatgcg ctgta                                            25

```
<210> SEQ ID NO 2
<211> LENGTH: 23
<212> TYPE: DNA
<213> ORGANISM: Artificial Sequence
<220> FEATURE:
<223> OTHER INFORMATION: primer

<400> SEQUENCE: 2
cctgaaaccc cttccacgaa gtc                                        23

<210> SEQ ID NO 3
<211> LENGTH: 18
<212> TYPE: DNA
<213> ORGANISM: Artificial Sequence
<220> FEATURE:
<223> OTHER INFORMATION: primer

<400> SEQUENCE: 3
cgggaaatcg tgcgtgac                                              18

<210> SEQ ID NO 4
<211> LENGTH: 20
<212> TYPE: DNA
<213> ORGANISM: Artificial Sequence
<220> FEATURE:
<223> OTHER INFORMATION: primer

<400> SEQUENCE: 4
atgcccagga aggaaggttg                                            20

<210> SEQ ID NO 5
<211> LENGTH: 21
<212> TYPE: DNA
<213> ORGANISM: Artificial Sequence
<220> FEATURE:
<223> OTHER INFORMATION: primer

<400> SEQUENCE: 5
tcactgccac ccagaagact g                                          21

<210> SEQ ID NO 6
<211> LENGTH: 19
<212> TYPE: DNA
<213> ORGANISM: Artificial Sequence
<220> FEATURE:
<223> OTHER INFORMATION: primer

<400> SEQUENCE: 6
ggatgacctt gcccacagc                                             19
```

<210> SEQ ID NO 7
<211> LENGTH: 23
<212> TYPE: DNA
<213> ORGANISM: Artificial Sequence
<220> FEATURE:
<223> OTHER INFORMATION: primer

<400> SEQUENCE: 7
tgacctcaac tacatggtct aca                                              23

<210> SEQ ID NO 8
<211> LENGTH: 19
<212> TYPE: DNA
<213> ORGANISM: Artificial Sequence
<220> FEATURE:
<223> OTHER INFORMATION: primer

<400> SEQUENCE: 8
cttcccattc tcggccttg                                                   19

<210> SEQ ID NO 9
<211> LENGTH: 18
<212> TYPE: DNA
<213> ORGANISM: Artificial Sequence
<220> FEATURE:
<223> OTHER INFORMATION: PNA probe

<400> SEQUENCE: 9
cagcaggatc tctggtct                                                    18

<210> SEQ ID NO 10
<211> LENGTH: 22
<212> TYPE: DNA
<213> ORGANISM: Artificial Sequence
<220> FEATURE:
<223> OTHER INFORMATION: PNA probe

<400> SEQUENCE: 10
atcgaatagt ctgactacaa ct                                               22

<210> SEQ ID NO 11
<211> LENGTH: 19
<212> TYPE: DNA
<213> ORGANISM: Artificial Sequence
<220> FEATURE:
<223> OTHER INFORMATION: PNA probe

<400> SEQUENCE: 11
atcttgattt tcatcgtgc                                                   19